US010023259B2

(12) United States Patent
Kroymann

(10) Patent No.: US 10,023,259 B2
(45) Date of Patent: Jul. 17, 2018

(54) ACCESSORY FOR A SELF-BALANCING BOARD

(71) Applicant: HOVERPOWERED, LLC, Palo Alto, CA (US)

(72) Inventor: Tyler Kroymann, Palo Alto, CA (US)

(73) Assignee: HOVERPOWERED, LLC, Palo Alto, CA (US)

( * ) Notice: Subject to any disclaimer, the term of this patent is extended or adjusted under 35 U.S.C. 154(b) by 0 days.

(21) Appl. No.: 15/633,722

(22) Filed: Jun. 26, 2017

(65) Prior Publication Data

US 2017/0355415 A1 Dec. 14, 2017

Related U.S. Application Data

(63) Continuation of application No. 15/423,564, filed on Feb. 2, 2017, now Pat. No. 9,688,340.

(Continued)

(51) Int. Cl.
*B62K 5/027* (2013.01)
*B62K 13/04* (2006.01)
(Continued)

(52) U.S. Cl.
CPC ............... *B62K 13/04* (2013.01); *B62J 1/08* (2013.01); *B62K 11/007* (2016.11); *B62K 19/30* (2013.01); *B62K 21/12* (2013.01)

(58) Field of Classification Search
CPC ...... B62K 13/04; B62K 11/007; B62K 21/12; B62K 19/30; B62J 1/08
See application file for complete search history.

(56) References Cited

U.S. PATENT DOCUMENTS 7,635,037 B2 12/2009 Treadwell et al.
7,647,999 B2 1/2010 Geiser
(Continued)

FOREIGN PATENT DOCUMENTS

CN 2592496 Y 12/2003
CN 104859773 A 8/2015
(Continued)

OTHER PUBLICATIONS

Inflatable Boats, "Hoverboard Sitting Attachments. Ride in Comfort!", https://www.youtube.com/watch?v=pJL6V3h9-Qg, Jan. 14, 2016, retrieved Aug. 28, 2017.
(Continued)

*Primary Examiner* — Brian L Swenson
(74) *Attorney, Agent, or Firm* — Millman IP Inc.

(57) ABSTRACT

An accessory for a self-balancing board is provided. The self-balancing board comprises a foot-deck having two lateral foot-deck ends. Each lateral foot-deck end is coupled to a motor that drives a wheel in response to an orientation of the lateral foot-deck end relative to a horizontal plane. The accessory includes a chassis, at least one travel surface-contacting element coupled proximal to a first longitudinal end of the chassis to facilitate travel of the chassis over a travel surface, and a seat coupled to the chassis and configured to support a person. The accessory further includes a first foot-deck engagement element proximal to a second longitudinal end of the chassis distal to the first longitudinal end and constructed to engage the foot-deck of the self-balancing board proximal to the first lateral foot-deck end, and a second foot-deck engagement element proximal to the second longitudinal end of the chassis and constructed to engage the foot-deck of the self-balancing board proximal to the second lateral foot-deck end. At least one control member coupled to the first foot-deck engagement element and
(Continued)

the second foot-deck engagement element controls the orientation of the lateral foot-deck ends relative to a horizontal plane via the first foot-deck engagement element and the second foot-deck engagement element.

19 Claims, 20 Drawing Sheets

Related U.S. Application Data

(60) Provisional application No. 62/290,704, filed on Feb. 3, 2016.

(51) Int. Cl.
*B62K 11/00* (2006.01)
*B62J 1/08* (2006.01)
*B62K 21/12* (2006.01)
*B62K 19/30* (2006.01)

(56) References Cited

U.S. PATENT DOCUMENTS

| | | | |
|---|---|---|---|
| 8,201,653 B2 * | 6/2012 | Strassman | B60N 2/002 180/218 |
| 8,424,628 B1 | 4/2013 | Schade | |
| 8,738,278 B2 | 5/2014 | Chen | |
| 9,403,573 B1 | 8/2016 | Mazzei et al. | |
| 2007/0131461 A1 | 6/2007 | Treadwell | |
| 2010/0025139 A1 | 2/2010 | Kosaka | |
| 2010/0117426 A1 | 5/2010 | Strassman | |
| 2010/0237645 A1 | 9/2010 | Trainer | |
| 2013/0062857 A1 | 3/2013 | Winter et al. | |
| 2015/0008051 A1 | 1/2015 | Halsall | |
| 2015/0353158 A1 | 12/2015 | Chang | |
| 2016/0325803 A1 | 11/2016 | Waxman et al. | |

FOREIGN PATENT DOCUMENTS

| | | |
|---|---|---|
| EP | 2713982 A1 | 4/2014 |
| KR | 100789906 B1 | 1/2008 |
| WO | 2012017335 A1 | 2/2012 |

OTHER PUBLICATIONS

Hoverseat, LLC, "Handles for Manual Operation of a Hoverboard", www.hoverseat.us, retrieved Nov. 29, 2016.

HoverBars LLC, "Enhance your stance", www.hoverbars.com, retrieved Nov. 29, 2016.

PCT/US2017/016305, International Search Report & Written Opinion, dated Apr. 28, 2017, US Patent Office.

EP 17724309, Supplementary European Search Report, dated Dec. 5, 2017, European Patent Office.

* cited by examiner

ACCESSORY FOR A SELF-BALANCING BOARD

CROSS-REFERENCE TO RELATED APPLICATIONS

This application is a continuation of U.S. patent application Ser. No. 15/423,564, filed on Feb. 2, 2017, the contents of which are incorporated herein by reference in their entirety.

FIELD

The specification relates generally to powered personal transportation devices. In particular, the following relates to an accessory for a self-balancing board.

BACKGROUND OF THE DISCLOSURE

Self-balancing boards are well known in the industry. Such self-balancing boards, however, require considerable effort and skill for a rider to safely balance themselves while riding such boards. In addition, instability is inherent and thus a closed-loop feedback control system is required in order to maintain balance. This means that, if at any moment, the control effort is inadequate, the rider can easily fall from the vehicle. This can be the result of a malfunction of the vehicle, or by the rider providing an extreme, inadequate, or over input, such as a lean angle that would result in an output (such as a desired wheel torque or speed) that is beyond the capability of the vehicle or the rider's ability to self-balance on the self-balancing board. In either case, if the output required to maintain balance is not achievable, the rider will likely fall, potentially causing injuries to themselves or others, or property damage. When the rider does fall, the risk of bodily injury is high due to the height of the standing user from the ground. There have been numerous documented incidents where riders have fallen off of self-balancing boards, leading to injuries that range from minor scrapes all the way to broken bones and concussions.

SUMMARY OF THE DISCLOSURE

In one aspect, there is provided an accessory for a self-balancing board, the self-balancing board comprising a foot-deck having two lateral foot-deck ends, each lateral foot-deck end being coupled to a motor that drives a wheel in response to an orientation of the lateral foot-deck end relative to a horizontal plane, the accessory comprising a chassis, at least one travel surface-contacting element coupled proximal to a first longitudinal end of the chassis to facilitate travel of the chassis over a travel surface, a seat coupled to the chassis and configured to support a person, a first foot-deck engagement element proximal to a second longitudinal end of the chassis distal to the first longitudinal end and constructed to engage the foot-deck of the self-balancing board proximal to the first lateral foot-deck end, a second foot-deck engagement element proximal to the second longitudinal end of the chassis and constructed to engage the foot-deck of the self-balancing board proximal to the second lateral foot-deck end, and at least one control member coupled to the first foot-deck engagement element and the second foot-deck engagement element to control the orientation of the lateral foot-deck ends relative to a horizontal plane via the first foot-deck engagement element and the second foot-deck engagement element.

The at least one control member can comprise at least one control lever being coupled to the first foot-deck engagement element and the second foot-deck engagement element to control pivoting of the first foot-deck engagement element and the second foot-deck engagement element.

The accessory can further comprise a bridging member coupled to the first foot-deck engagement element and the second foot-deck engagement element to control pivoting of the first foot-deck engagement element and the second foot-deck engagement element relative to one another.

The at least one control lever can comprise a first control lever coupled to the first foot-deck engagement element and the second foot-deck engagement element to thereby control simultaneous pivoting of the first foot-deck engagement element and the second foot-deck engagement element.

The at least one control lever can comprise a first control lever coupled to the first foot-deck engagement element and a second control lever coupled to the second foot-deck engagement element.

The first foot-deck engagement element can be independently pivotable relative to the second foot-deck engagement element about a control pivot axis that is generally parallel to the rotation axis of the wheels of the self-balancing board.

Each of the first foot-deck engagement element and the second foot-deck engagement element can comprise an interface member constructed to interface with the foot-deck proximal to one of the lateral foot-deck ends and having at least two degrees of freedom of movement relative to the chassis.

Each of the first foot-deck engagement element and the second foot-deck engagement element can further comprise a control foot that is independently pivotable relative to the chassis about the control pivot axis that is generally parallel to the rotation axis of the wheels of the self-balancing board and is movably coupled to the interface member to enable movement of the control foot relative to the interface member.

The control foot can be pivotally coupled to the interface member about a torque pivot axis that is generally perpendicular to the control pivot axis.

The first foot-deck engagement element can be constructed to secure to the foot-deck of the self-balancing board proximal to the first lateral foot-deck end and the second foot-deck engagement element can be constructed to secure to the foot-deck of the self-balancing board proximal to the second lateral foot-deck end.

The first foot-deck engagement element can be constructed to releasably secure to the foot-deck of the self-balancing board proximal to the first lateral foot-deck end and the second foot-deck engagement element can be constructed to releasably secure to the foot-deck of the self-balancing board proximal to the second lateral foot-deck end.

Each of the first foot-deck engagement element and the second foot-deck engagement element can comprise a fastener for releasably securing the interface member against the foot-deck. The interface member can comprise the fastener. The fastener can comprise at least one of a strap, a clamp, and a magnetic element.

The control foot can be pivotally secured to the interface member. The fastener can couple directly to the control foot. The fastener can comprise at least one of a strap, a clamp, and a magnetic element. The interface member can comprise features restricting movement of the control foot relative to the interface member within a desired range.

Each of the control levers can be adjustably coupled to one of the foot-deck engagement elements and lockable in one of a set of orientations relative to the one foot-deck engagement element.

The interface member can comprise laterally extending lips that are constructed to overhang front and rear edges of the foot-deck to prevent movement of the interface member relative to the foot-deck.

The seat can be positioned proximal to the second end.

A position of the seat longitudinally along the chassis can be adjustable.

The at least one travel surface-contacting element can be a freely spinning wheel.

The accessory can further comprise a biasing structure biasing one of the first foot-deck engagement element and the at least one control lever to a position relative to the chassis wherein the foot-deck of the self-balancing board is unbiased away from a generally horizontal orientation when the accessory is positioned thereon.

The biasing structure can comprise at least one biasing spring biasing the one of the first foot-deck engagement element and the at least one control lever relative to the chassis.

The first foot-deck engagement element and the second foot-deck engagement element can be constructed to avoid contact with a central region of the foot-deck when the accessory is positioned thereon. The first foot-deck engagement element and the second foot-deck engagement element can have gaps positioned on the central region of the foot-deck when the accessory is positioned thereon.

In another aspect, there is provided a method of using a self-balancing board, comprising placing a first foot-deck engagement element of an accessory on a foot-deck of a self-balancing board proximal to a first lateral foot-deck end thereof, the self-balancing board further comprising a second lateral foot-deck end of the foot-deck, each of the first lateral foot-deck end and the second lateral foot-deck end being coupled to a motor that drives a wheel in response to an orientation of the lateral foot-deck end relative to a horizontal plane, the accessory further comprising a chassis having a first longitudinal end, and a second longitudinal end proximal to the first foot-deck engagement element, at least one travel surface-contacting element coupled proximal to a first longitudinal end of the chassis to facilitate travel of the chassis over a travel surface, a seat coupled to the chassis and configured to support a person, a second foot-deck engagement element proximal to the second longitudinal end of the chassis, and at least one control member coupled to the first foot-deck engagement element and the second foot-deck engagement element to control the orientation of the lateral foot-deck ends relative to a horizontal plane via the first foot-deck engagement element and the second foot-deck engagement element, and placing the second foot-deck engagement element on the foot-deck of the self-balancing board proximal to a second lateral foot-deck end thereof.

The at least one control member can comprise at least one control lever being coupled to the first foot-deck engagement element and the second foot-deck engagement element to control pivoting of the first foot-deck engagement element and the second foot-deck engagement element.

The method can further comprise releasably securing the first foot-deck engagement element to the first lateral foot-deck end, and releasably securing the second foot-deck engagement element to the second lateral foot-deck end.

BRIEF DESCRIPTIONS OF THE DRAWINGS

For a better understanding of the various embodiments described herein and to show more clearly how they may be carried into effect, reference will now be made, by way of example only, to the accompanying drawings in which.

Figure 1:
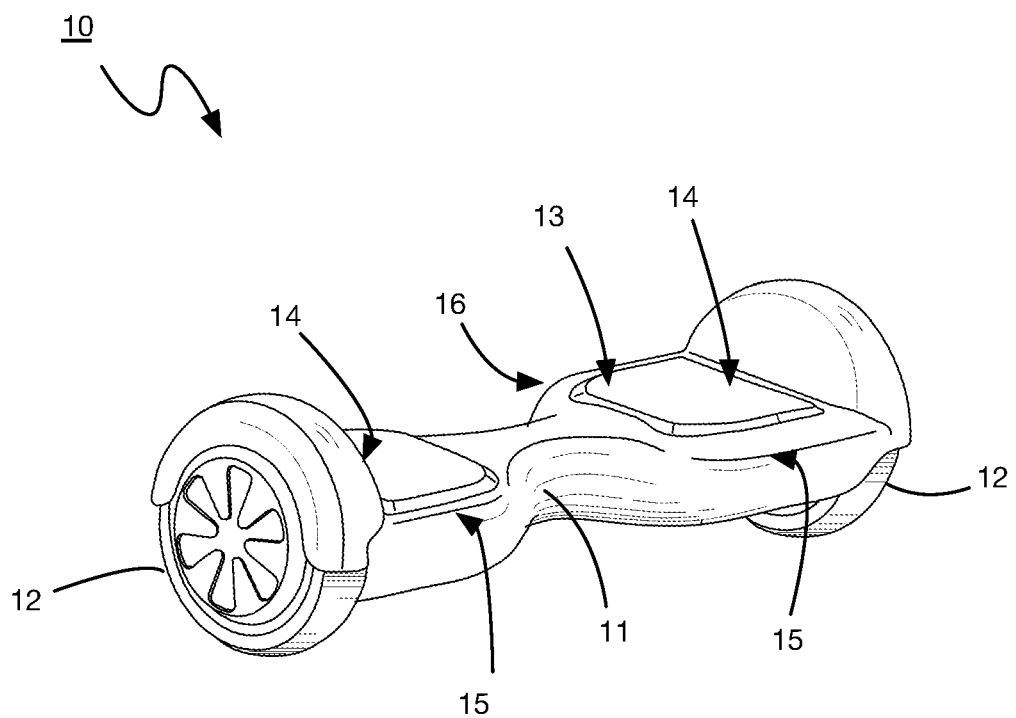
FIG. 1 is a perspective view of one type of a self-balancing board.
Figure 2:
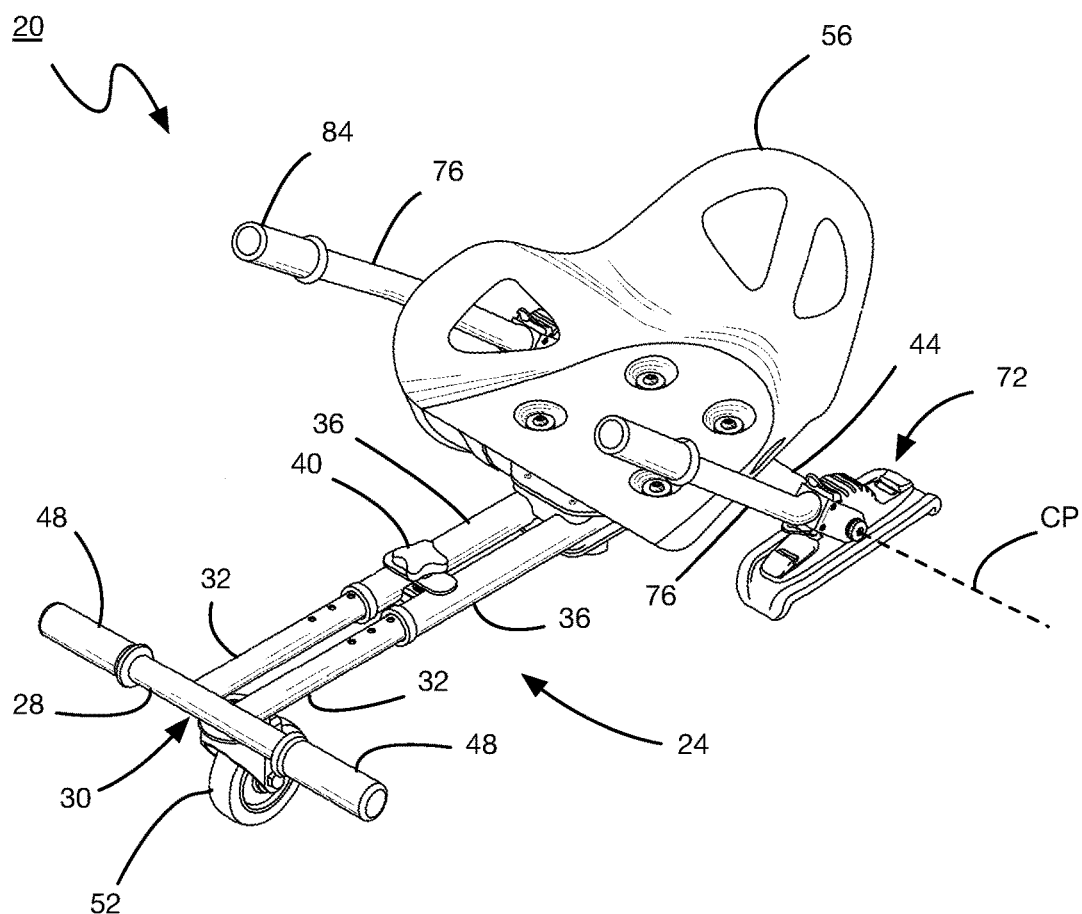
FIG. 2 is a perspective view of an accessory for the self-balancing board of FIG. 1 in accordance with an embodiment.
Figure 3:
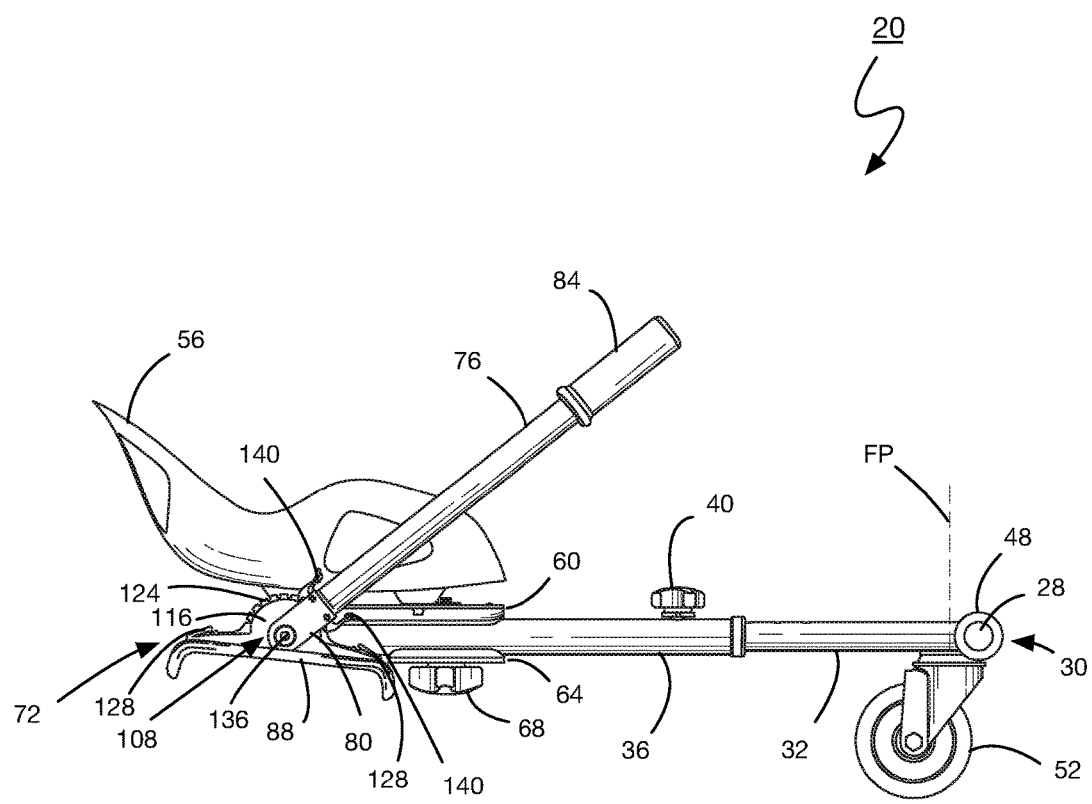
FIG. 3 is a side view of the accessory of FIG. 2.
Figure 4:
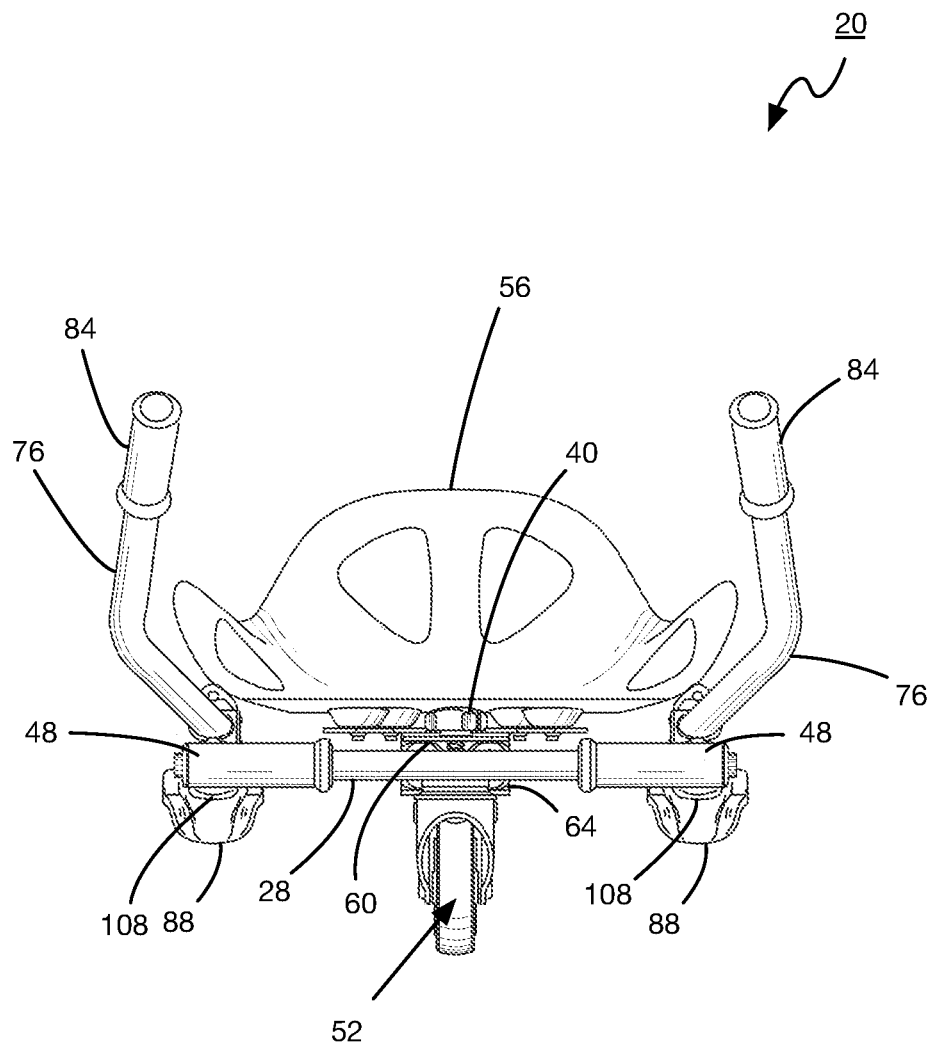
FIG. 4 is a front view of the accessory of FIG. 2.
Figure 5:
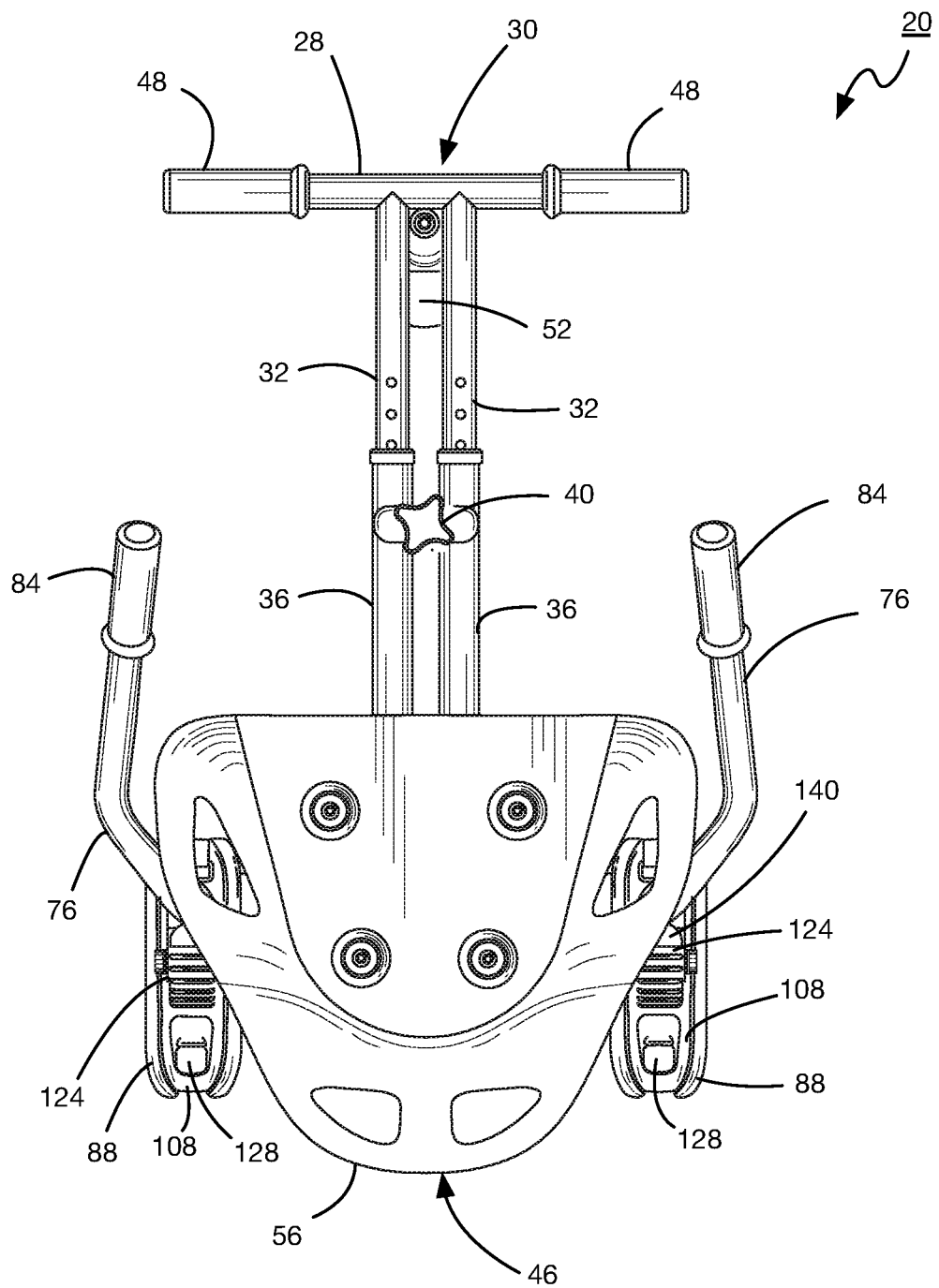
FIG. 5 is a top view of the accessory of FIG. 2.
Figure 6:
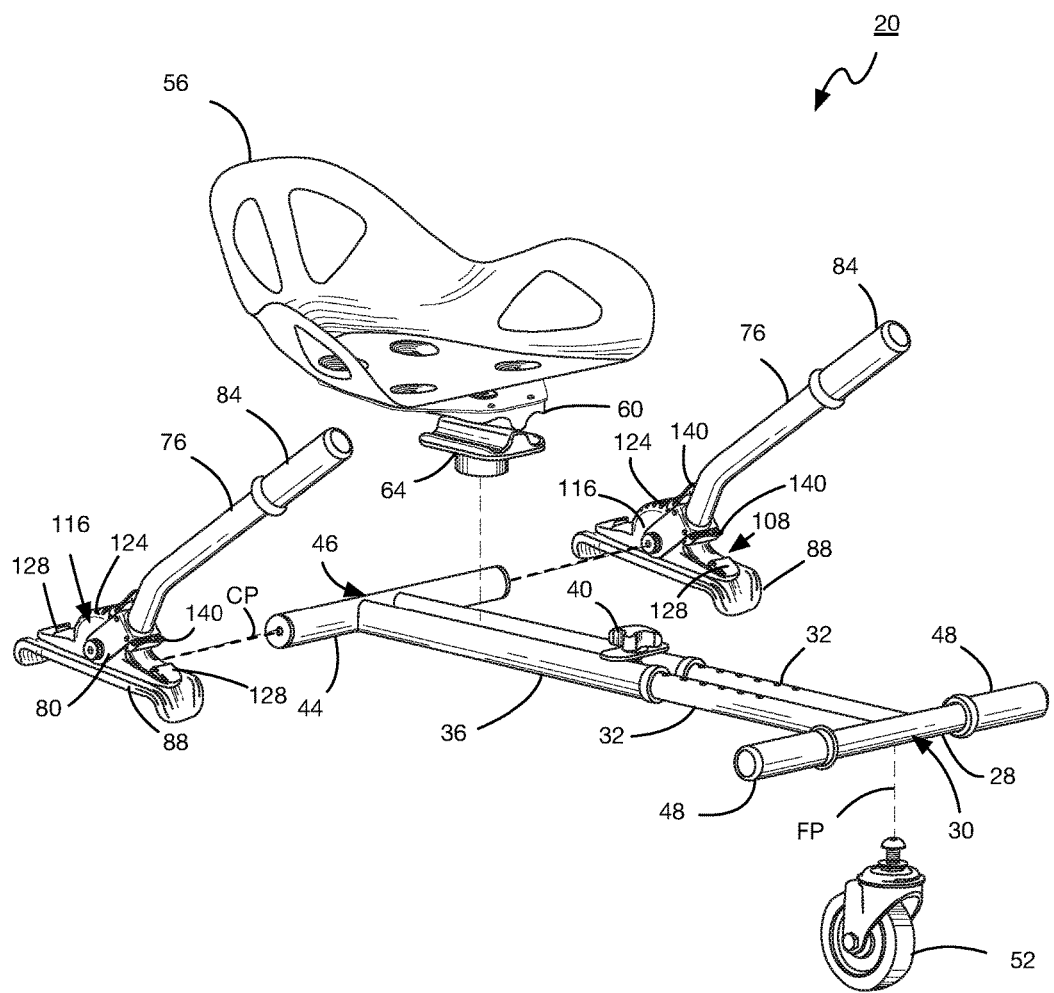
FIG. 6 is a partially exploded perspective view of the accessory of FIG. 2.
Figure 7:
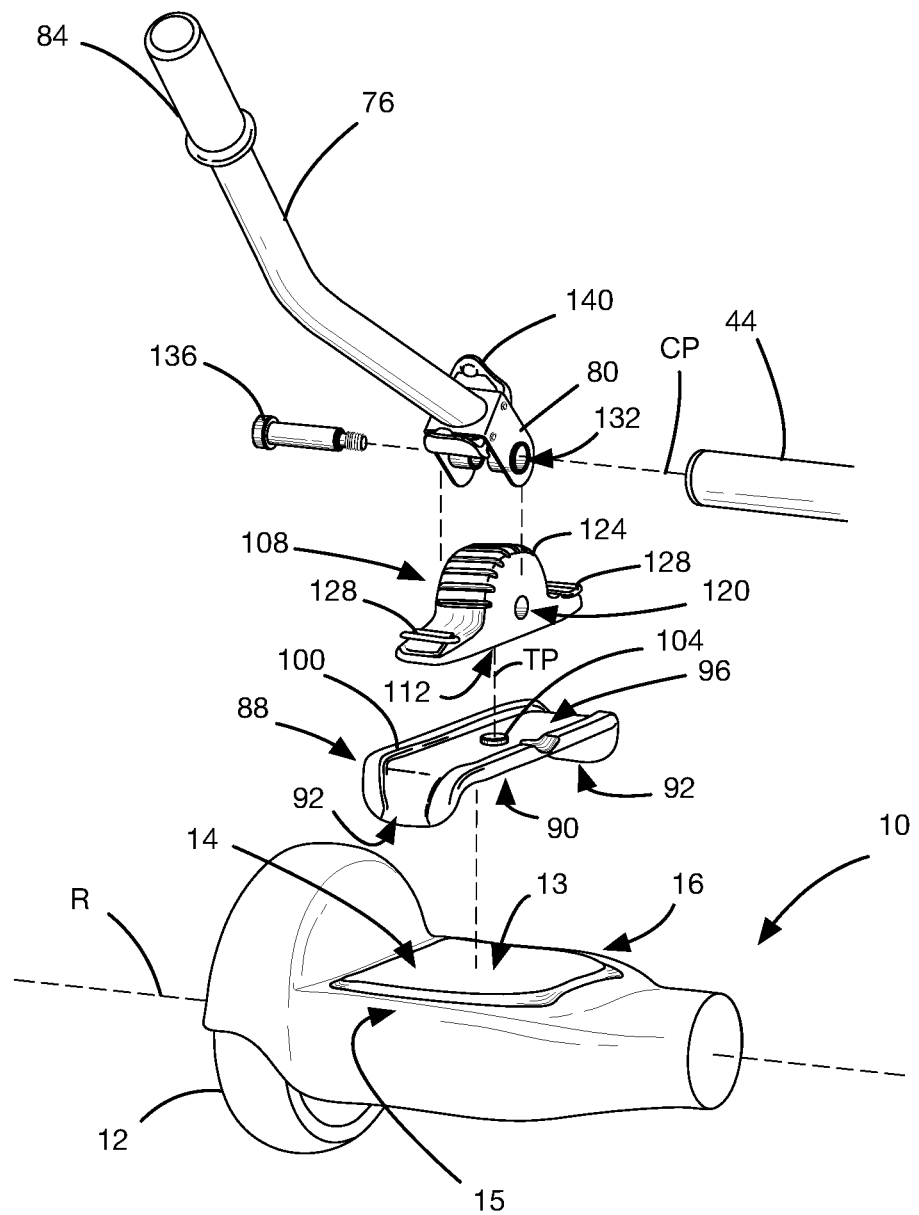
FIG. 7 is a partially exploded perspective view of a portion of a foot-deck engagement element and a control lever of the accessory of FIG. 2 aligned with a portion of the foot-deck of the self-balancing board of FIG. 1.
Figure 8:
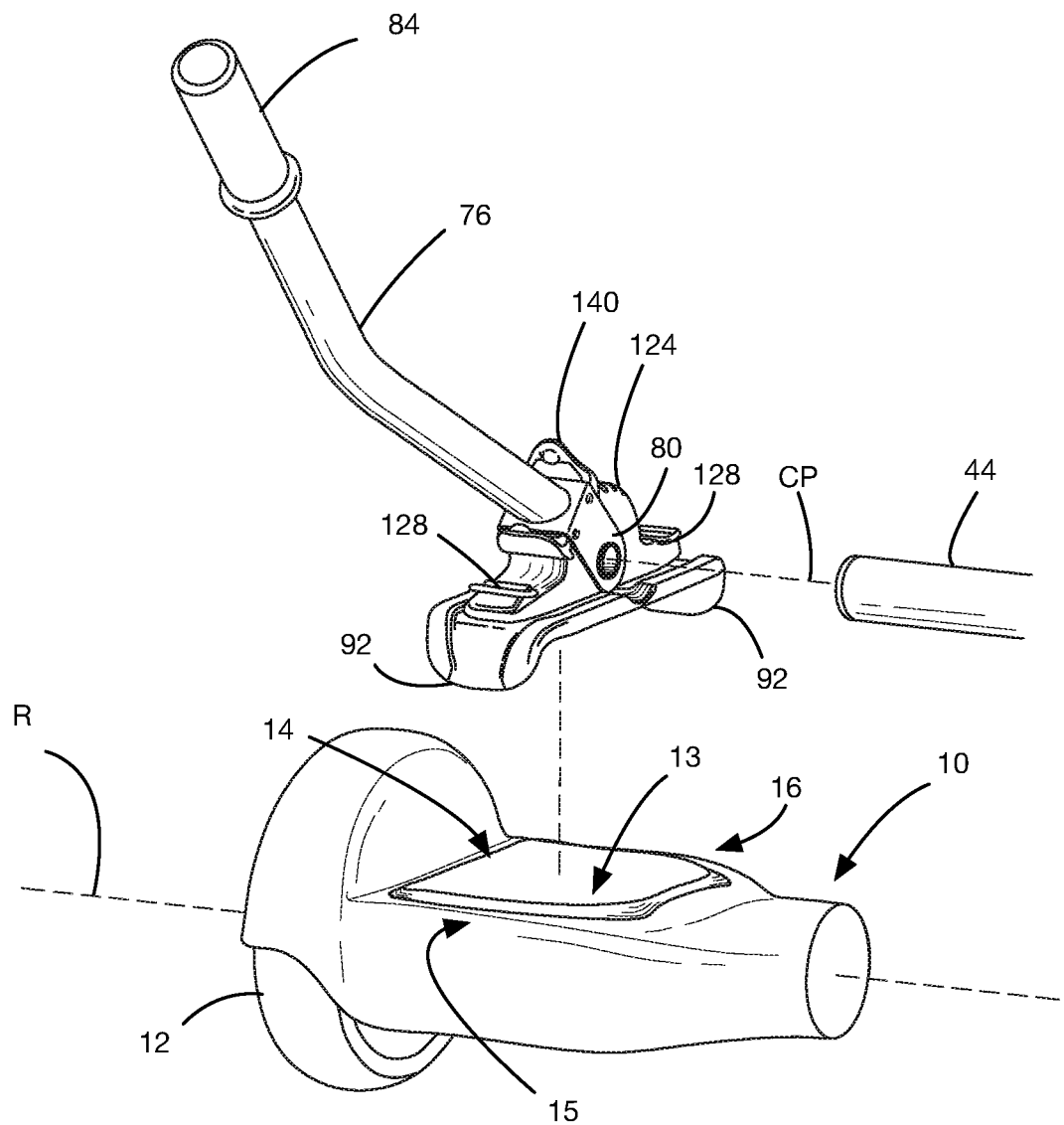
FIG. 8 is another partially exploded perspective view of the portion of a foot-deck engagement element and the control lever of the accessory of FIG. 2 aligned with a portion of the foot-deck of the self-balancing board of FIG. 1.
Figure 9:
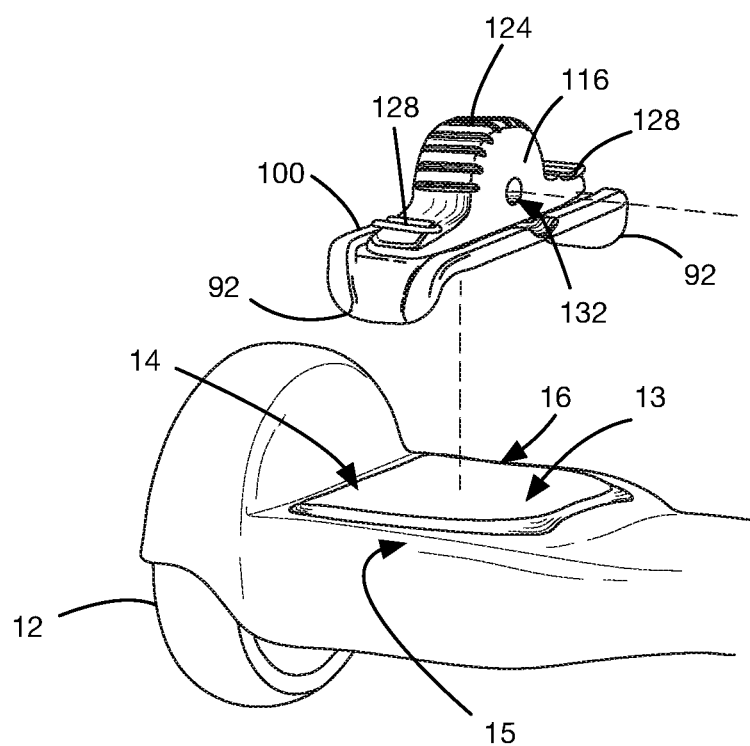
FIG. 9 shows a perspective view of the portion of the foot-deck engagement element of the accessory of FIG. 2 aligned with a portion of the foot-deck of the self-balancing board of FIG. 1.
Figure 10:
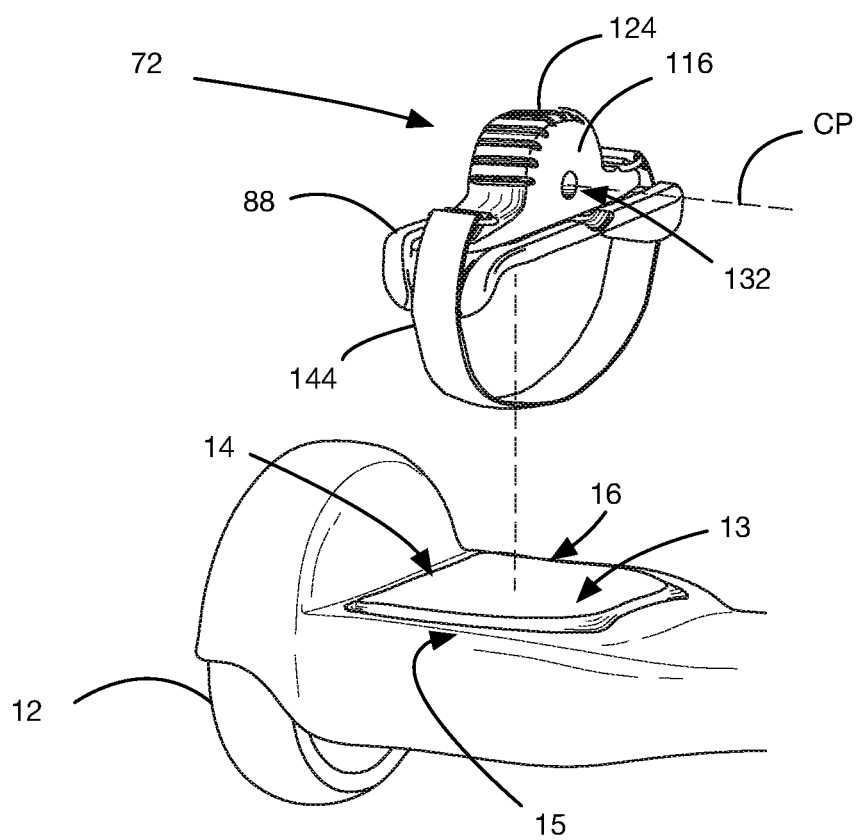
FIG. 10 is a perspective view of the foot-deck engagement element of the self-balancing board of FIG. 2 aligned with a portion of the foot-deck of the self-balancing board of FIG. 1.

REFERENCE NUMBER INDEX 10 self-balancing board
11 platform
12 wheel 13 foot-deck
14 lateral foot-deck end
15 front foot-deck edge
16 rear foot-deck edge
20 accessory for a self-balancing board
24 chassis
28 front cross-bar
30 front longitudinal end
32 longitudinal extension tube
36 telescoping longitudinal tube
40 locking knob
44 rear cross-bar
46 rear longitudinal end
48 foot rest
52 front wheel assembly
56 seat
60 top seat mounting bracket
64 bottom seat mounting bracket
68 seat mounting locking knob
72 foot-deck engagement element
76 control lever
80 control lever pivot bracket
84 control grip
FP front pivot axis
88 interface member
90 underside surface
92 laterally extending lip
96 top recess
100 lateral ridge
104 torque pivot post
108 control foot
112 pivot post aperture
116 positioning arch
120 pivot through-hole
124 position teeth
128 strap engagement hook
132 control lever pivot through-hole
136 pivot bolt
140 positioning lock release lever
CP control pivot axis
TP torque pivot axis
144 cinch strap
150 accessory
154 interface member
158 thicker end
162 gap
170 accessory
172 control lever
174 control lever pivot bracket
176 control pivot through-hole
178 pin-hole
180 pivot bolt
182 bolt head
184 deep slot
186 threaded hole
188 threaded screw
190 biasing spring
192 cross-portion
194 angled coil end
200 accessory
204 chassis
208 longitudinal extension tube
212 telescoping longitudinal tube
216 locking knob
220 rear cross-bar
224 pivot bracket
228 head assembly
232 head pivot bolt
236 front cross-bar
240 foot rest
244 front wheel assembly
248 seat
252 seat mounting bracket
256 master foot-deck engagement element
260 interface member
264 control foot
268 positioning arch
272 strap engagement hook
276 control lever
280 control lever pivot bracket
284 control grip

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Accessories for self-balancing boards are provided. The self-balancing boards have a foot-deck having two lateral foot-deck ends. Each lateral foot-deck end is coupled to a motor that drives a wheel in response to an orientation of the lateral foot-deck end relative to a horizontal plane. The accessory includes a chassis, at least one travel surface-contacting element coupled proximal to a first longitudinal end of the chassis to facilitate travel of the chassis over a travel surface, and a seat coupled to the chassis and configured to support a person. A first foot-deck engagement element is proximal to a second longitudinal end of the chassis distal to the first longitudinal end and is constructed to engage the foot-deck of the self-balancing board proximal to the first lateral foot-deck end. A second foot-deck engagement element is proximal to the second longitudinal end of the chassis and is constructed to engage the foot-deck of the self-balancing board proximal to the second lateral foot-deck end. At least one control member is coupled to the first foot-deck engagement element and the second foot-deck engagement element to control the orientation of the first and second lateral foot-deck ends relative to a horizontal plane via the first foot-deck engagement element and the second foot-deck engagement element.

The accessories use the self-balancing boards in a manner that differs from the method in which they were originally intended to be used. By adding at least one additional travel surface-contacting element, a rider may place their center of gravity over the area between the two wheels of the self-balancing board and the at least one travel surface-contacting element, thereby providing a stable stage to ride upon while still using the motor means of the self-balancing board to propel the self-balancing board and the accessory. Further, the accessories enable the lateral foot-deck ends to be actuated via at least one control member coupled to the foot-deck engagement elements to control the orientation of the lateral foot-deck ends of the self-balancing board relative to a horizontal plane.

A self-balancing board 10 is shown in FIG. 1. The self-balancing board 10 has a platform 11 that spans between two wheels 12. A foot-deck 13 of the platform 11 enables a rider to stand thereon. The foot-deck 13 is generally planar and may be textured and/or made from a material that provides traction between the foot of a rider and the platform 11. The foot-deck 13 has two lateral foot-deck ends 14 adjacent the wheels 12, a front foot-deck edge 15, and a rear foot-deck edge 16. The front foot-deck edge 15 and the rear foot-deck edge 16 represent the intersections between the front and back surfaces of the platform 11 and the foot-deck 13.

A motor proximal to each lateral foot-deck end 14 powers the wheel adjacent to it. Each motor is operated to rotate the adjacent wheel 12 based on the pitch of the lateral foot-deck end 14 relative to a horizontal plane when the self-balancing board is upright. The platform 11 may be, in some cases, split into two platform halves that can pivot relative to each other around an axis that is generally coaxial or at least generally parallel to the rotation axis of the wheels 12. In such cases, the orientation of the lateral foot-deck ends 14 can be determined via gyroscopes, accelerometers, or the like. In other cases, the platform 11 may be constructed to permit flexing of the platform 11, thereby enabling one lateral foot-deck end 14 to pivot somewhat independently of the other lateral foot-deck end 14 as a result of torsion forces on the platform. The pivoting between the lateral foot-deck ends 14 can be determined using a strain gauge or the like.

If both lateral foot-deck ends 14 are similarly pitched in one direction, both adjacent motors will drive the self-balancing board in that direction at a similar speed, thus causing the self-balancing board to move in that direction. Alternatively, if both lateral foot-deck ends 14 are differently pitched in the same direction, the motors will drive the self-balancing board in that general direction, and the motor adjacent the more pitched lateral foot-deck end 14 will operate its associated wheel 12 more rapidly, causing the self-balancing board to turn in that direction. If one lateral foot-deck end 14 is pitched in one direction and the other lateral foot-deck end 14 is similarly pitched in the opposite direction, the motors will rotate the wheels in opposite directions, causing the self-balancing board 10 to rotate at its location.

An accessory 20 for the self-balancing board 10 of FIG. 1 in accordance with an embodiment is shown in FIGS. 2 to 6. The accessory 20 is intended to enhance both the safety and enjoyment of the self-balancing board by effectively converting a traditional self-balancing board into a powered kart that, when ridden, generally lowers the rider's center of gravity. The accessory 20 includes a chassis 24 that has a front cross-bar 28 at a front longitudinal end 30. Two parallel longitudinal extension tubes 32 extend backward from the front cross-bar 28 and are slidingly received within two parallel telescoping longitudinal tubes 36 and lockable at a number of positions via a locking knob 40. The two telescoping longitudinal tubes 36 are adjoined to a rear cross-bar 44 at a rear longitudinal end 46 of the chassis 24. The front cross-bar 28, the longitudinal extension tubes 32, the telescoping longitudinal tubes 36 and the rear cross-bar 44 can be made of any suitable material, such as aluminum or steel. The front cross-bar 28 is secured to the longitudinal extension tubes 32 via welding or another suitable approach. Similarly, the telescoping longitudinal tubes 36 are secured to the rear cross-bar 44 via welding or another suitable approach.

Two foot rests 48 are secured to opposite ends of the front cross-bar 28. The foot rests 48 provide a place to position one's feet so that the rider's feet do not drag on a travel surface. The foot rests 48 can be used to carry the accessory 20 when it is not being ridden, either when the accessory 20 is secured to the self-balancing board 10 or detached from it. Further, the foot rests 48 can include heel rests in other embodiments to inhibit slippage of the rider's heels onto the travel surface. A front wheel assembly 52 is pivotally coupled to the front cross-bar 28 to enable the front wheel assembly 52 to swivel around a front wheel pivot axis FP that is generally vertically aligned when the accessory 20 is upright.

A seat 56 is shown secured to the telescoping longitudinal tubes 36 of the chassis 24 proximal to the rear longitudinal end 46 thereof via a top seat mounting bracket 60 and a bottom seat mounting bracket 64 that are clamped together atop of the telescoping longitudinal tubes 36 via a seat mounting locking knob 68. The seat 56 can be a basic molded seat made of plastic or the like. Alternatively, the seat 56 can be provided with padding and/or suspension to make the rider's experience more enjoyable and to protect the rider from jarring while traveling over less smooth travel surfaces. The position of the seat 56 along the chassis 24 can be adjusted by loosening the seat mounting locking knob 68, sliding the seat 56 forward or backward as desired, and then tightening the seat mounting locking knob 68. The seat 56 may be mounted as low as possible to reduce the height of the center of gravity. This also brings the rider closer to the ground, reducing the chance of injury to the rider in the event of a fall.

A foot-deck engagement element 72 is pivotally coupled to each lateral end of the rear cross-bar 44 so that the foot-deck engagement elements 72 pivot about a control pivot axis CP.

The accessory 20 includes a control member for controlling the orientation of the lateral foot-deck ends 14. The control members are, in this embodiment, a control lever 76 is coupled to each foot-deck engagement element 72 via a control lever pivot bracket 80. The control lever 76 is typically constructed of steel or aluminum and welded to the control lever pivot bracket 80. A control grip 84 mounted on the control lever 76 enables a rider to grip and manipulate the control lever 76.

Referring now to FIGS. 1 to 10, each foot-deck engagement element 72 includes an interface member 88 that is constructed to interface with the foot-deck proximal to one of the lateral foot-deck ends. The interface member 88 is made of a resilient compressible material, such as rubber, to engage the foot-deck 13 of the self-balancing board 10 proximal to a lateral foot-deck end 14 thereof. The interface member 88 is the portion of the accessory 20 that directly interfaces with and actuates the foot-deck. It has a generally flat underside surface 90 to enable a greater surface area of the underside surface 90 to engage the foot-deck 13 to thereby resist slippage. Two laterally extending lips 92 span the lateral width of the interface member 88 and engage the front and back foot-deck edges 15, 16 of the platform 11 to prevent movement of the interface member 88 relative to the foot-deck 13. A generally planar top recess 96 is formed between two lateral ridges 100 that extend along the longitudinal length of the foot-deck control surface 88. A torque pivot post 104 extends upward from the top recess 96.

A control foot 108 is dimensioned to fit within the top recess 96 of the interface member 88 and has a pivot post aperture 112 on its bottom surface to receive the torque pivot post 104 of the interface member 88. The control foot 108 is the element of the assembly 20 that acts to pivot the lateral foot-deck ends 14 by application of pressure on the front and rear portions of the foot-deck. The control foot 108 can pivot about a torque pivot axis TP that is generally perpendicular to the control pivot axis CP, and defined by the torque pivot post 104 of the interface member 88 when the control foot 108 is held against it. The lateral ridges 100 of the interface member 88 limit movement of the control foot 108 to within a desired range. The control foot 108 and the torque pivot post 104 can be magnetized to keep the control foot 108 secured to the interface member 88 during assembly to prevent the interface member 88 from falling off of the control foot 108 during mounting/installation of the accessory 20 to the self-balancing board 10.

A positioning arch 116 having an arcuate top surface is formed on the top surface of the control foot 108. A pivot through-hole 120 passes laterally through the positioning arch 116. Laterally extending position teeth 124 are formed along the top surface of the positioning arch 116. A strap engagement hook 128 is formed on the top surface of the control foot 108 proximal to each of its front and rear ends.

A control lever pivot through-hole 132 extends laterally through the control lever pivot bracket 80. The control lever pivot bracket 80 is fitted over the positioning arch 116 and a pivot bolt 136 is inserted through the control lever pivot through-hole 132 and the pivot through-hole 120 of the control foot 108 before it is secured to the rear cross-bar 44. Positioning lock release levers 140 of the control lever 76 are releasably biased, such as via a spring, to engage the position teeth 124 to lock the angular position of the control lever 76 relative to the positioning arch 116. Manual actuation of the positioning lock release levers 140 enables pivoting of the control lever 76 about the positioning arch 116 to adjust the angular position of the control lever 76 relative to the control foot 108, and release of the positioning lock release levers 140 enables them to re-engage the position teeth 124 to thereby lock the angular position of the control lever 76.

A cinch strap 144 is secured at each end of the control foot 108 via one of the strap engagement hooks 128. The cinch strap 144 is made from a durable, flexible material such as hook-and-loop fabric or nylon.

Figure 11:
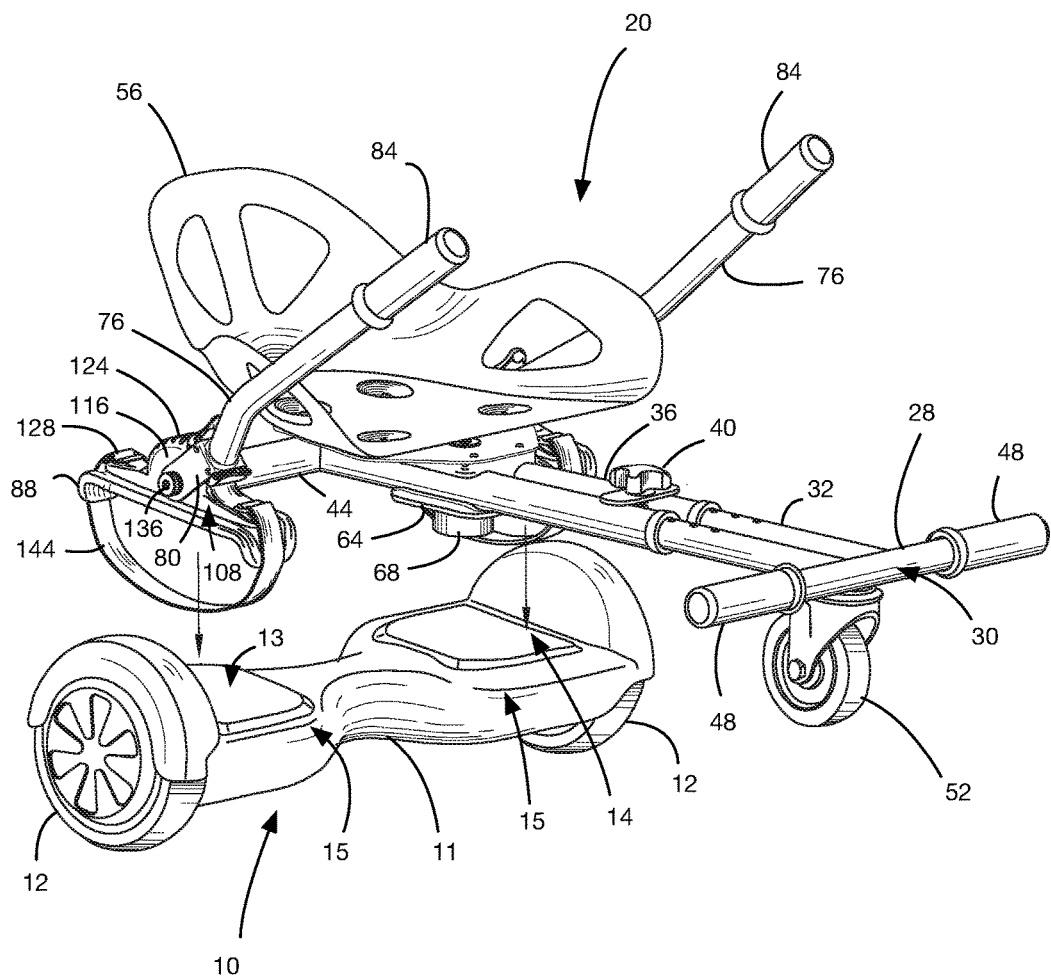
FIG. 11 is a perspective view of the accessory of FIG. 2 aligned with the self-balancing board of FIG. 1.

FIG. 11 shows the assembled accessory 20 prior to being secured to the self-balancing board 10. In order to secure the accessory 20 to the self-balancing board 10, one end of the cinch straps 144 is undone. The interface members 88 are then aligned with and lowered onto the foot-deck 13 so that each interface member 88 is proximal to one of the lateral foot-deck ends 14, with the laterally extending lips 92 of the interface members 88 overhanging the front foot-deck edges 15 and the rear foot-deck edges 16. Each cinch strap 144 is then pulled underneath the platform 11 and secured to the other strap engagement hook 128 and tightened.

Figure 12:
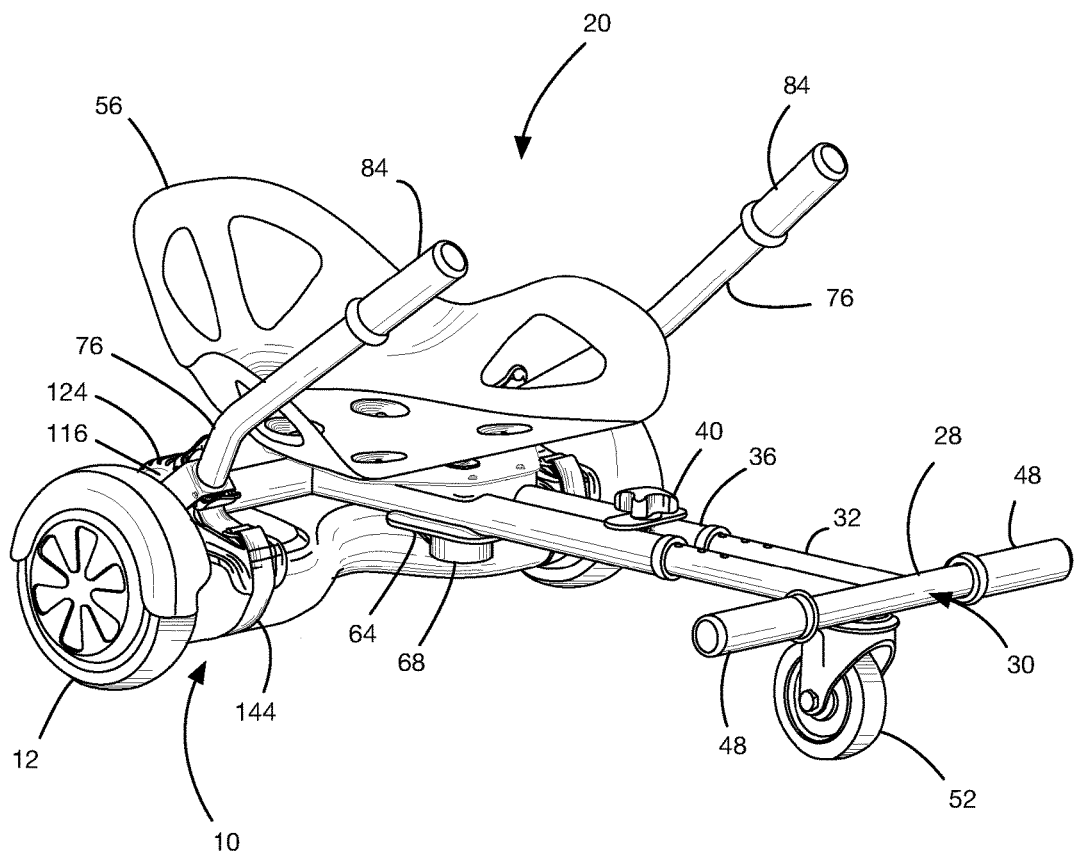
FIG. 12 is a perspective view of the accessory of FIG. 2 secured to the self-balancing board of FIG. 1.

FIG. 12 shows the accessory 20 after the cinch straps 144 have secured it to the self-balancing board 10. As can be seen, the cinch straps 144 are tightly secured to the platform 11 of the self-balancing board 10 so that pivoting of the control levers 76 causes the lateral foot-deck ends 14 of the self-balancing board 10 to pivot.

It may also be desirable to adjust various aspects of the accessory 20 for the rider. For example, the distance from the seat 56 to the foot rests 48 to accommodate for a rider's height or preference can be adjusted by loosening the locking knob 40, and either pulling the longitudinal extension tubes 32 further out of the telescoping longitudinal tubes 36, or by sliding the longitudinal extension tubes 32 further into the telescoping longitudinal tubes 36.

Figure 13:
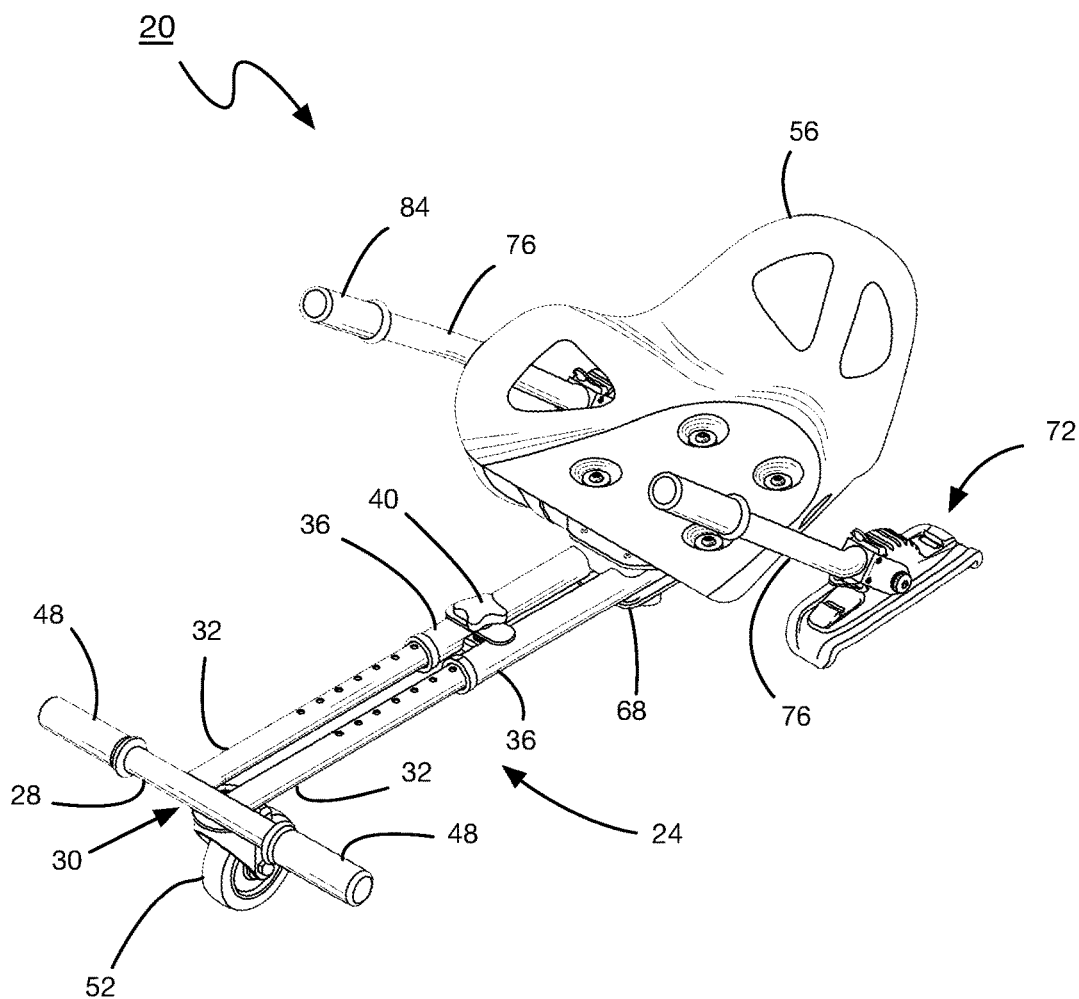
FIG. 13 is a perspective view of the accessory of FIG. 2 secured to the self-balancing board of FIG. 1 wherein the chassis has been extended longitudinally.

FIG. 13 shows the accessory 20 after extension of the longitudinal extension tubes 32 out of the telescoping longitudinal tubes 36, thereby providing a longer chassis 24.

Another approach to changing this distance is to loosen the seat mounting locking knob 68 underneath the chassis 24, sliding the seat forward or backward, and then tightening the seat mounting locking knob 68 again to retain the seat 56 in the new position.

Figure 14:
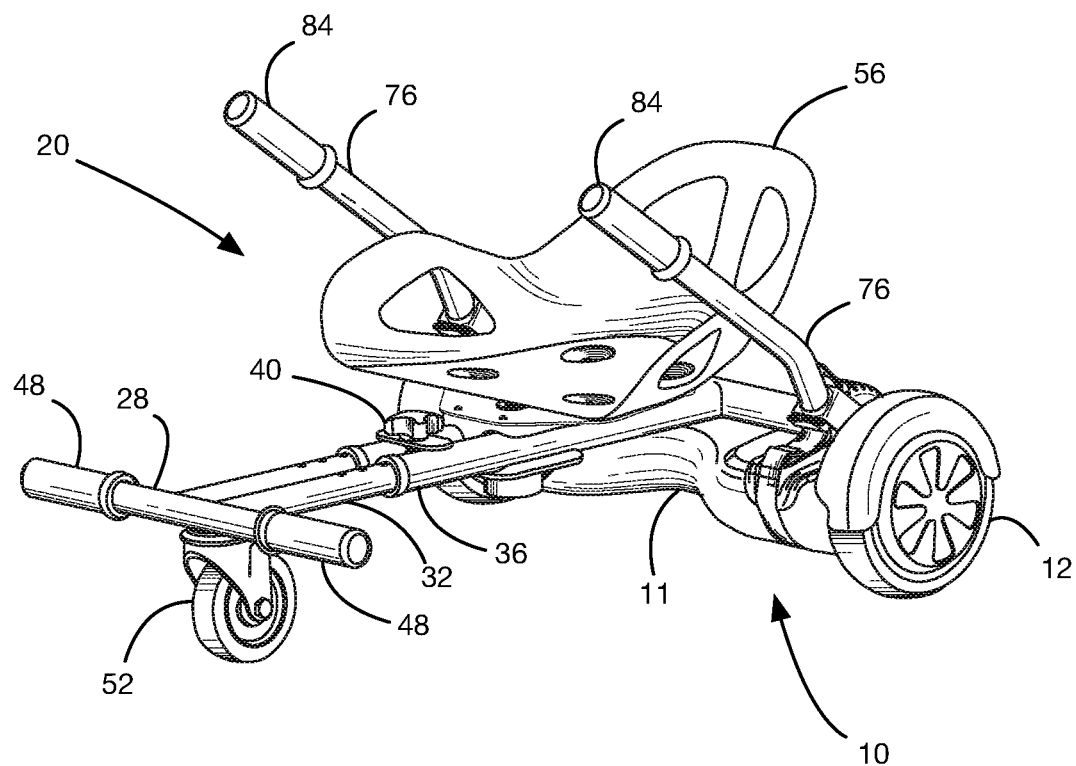
FIG. 14 is a perspective view of the accessory of FIG. 2 secured to the self-balancing board of FIG. 1, wherein the seat has been positioned forward.

FIG. 14 shows the seat 56 having been adjusted forward. As can be seen, the center of gravity of the rider is shifted forward. It can be advantageous in some scenarios to shift the rider's weight more to the front wheel assembly 52, thereby reducing the chance that the accessory 20 will not tip up (perform a "wheelie") under strong acceleration via the self-balancing board 10. In other scenarios, it may be desirable to move the seat 56 backwards to facilitate the performance of "wheelies" using the accessory 20, which may be desirable for some less risk-averse or more skilled riders.

As will be appreciated, the length of the rider can be compensated for by adjusting both the extension of the longitudinal extension tubes 32 relative to the telescoping longitudinal tubes 36 and by adjusting the positioning of the seat 56 along the chassis 24.

Yet another way in which the accessory 20 can be customized for a rider is by adjusting the angular position of the control levers 76 and thus the height of the control grips 84. This is done on each side by manually pressing together the positioning lock release levers 140, pivoting the control lever 76 to a desired angular position, and then releasing the positioning lock release levers 140 so that they can re-engage the position teeth 124 at the new angular position. The position teeth 124 define a number of angular positions in which the control levers 76 can be locked.

Figure 15:
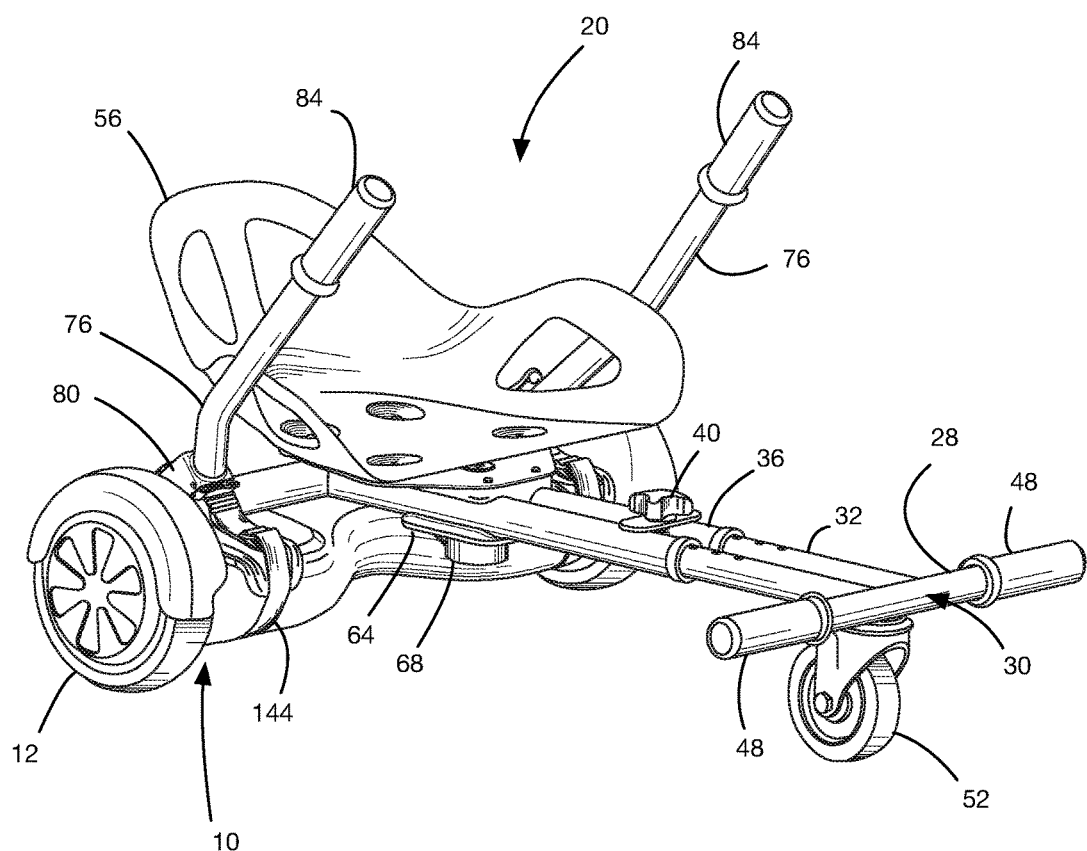
FIG. 15 is a perspective view of the accessory of FIG. 2 secured to the self-balancing board of FIG. 1, wherein the control levers have been adjusted to a different angular position.

FIG. 15 shows the accessory 20 after adjustment of the control levers 76 to a different angular position. As shown, the control levers 76 have been pivoted about the control pivot axis and engage position teeth that are further back around the positioning arch from those engaged in the angular position of the control levers 76 shown in FIG. 12.

Referring now to FIGS. 7 to 12, operation of the accessory 20 will now be described. When the accessory 20 has been secured to the self-balancing board 10 and a rider is sitting in the seat 56, part of the weight of the rider is distributed to the self-balancing board 10 via the interface members 88. This helps to reduce slippage of the interface members 88 relative to the foot-deck 13. The control levers 76 are secured to the control feet 108, and both pivot about the control pivot axis P that is coaxial with the rear cross-bar 44 of the chassis 24. The interface members 88 are held firmly in place atop of the foot-deck 13 by the tension of the cinch straps 144. Forward and backward shifting of the control feet 108 within the top recess 96 is also inhibited by the torque pivot posts 104 being inserted in the pivot post apertures 112 of the control feet 108, and by the longitudinal (front to rear) length of the control feet 108 in combination with the tautness of the cinch straps 144.

When a rider is in the seat 56 of the accessory 20, the rider can cause either wheel 12 of the self-balancing board 10 to which the accessory 20 is secured to accelerate in either a forward or backward direction. This is achieved by using the corresponding control lever 76 as a lever to pivot the lateral foot-deck end 14. The control levers 76 freely pivot relative to the chassis 24. Pivoting the control lever 76 in a direction applies a torqueing force to the corresponding lateral foot-deck end 14 by the force of the longitudinal end of the control foot 108 corresponding to the direction in which the control lever 76 is being pivoted on the lateral foot-deck end 14, and by the tension of the cinch strap 144.

The control levers 72 can be pivoted in either a forward or backward direction. Pivoting both control levers 76 by the same degree and in the same direction causes the wheels 12 to accelerate or decelerate in the direction to which the control levers are being pivoted 76. Thus, a rider can elect to accelerate or decelerate in a forward direction or a backward direction, or stop.

Additionally, a rider can elect to pivot each control lever 76 to differing angles to cause a difference in the speed of the wheels 12, thereby causing the combined self-balancing board 10 and the accessory 20 secured thereto to turn as it travels. The rider can even rotate the self-balancing board 10 and the accessory 20 secured thereto in a single location if one control lever 76 is pivoted to pivot the corresponding lateral foot-deck end 14 by an angular disposition in one direction, and if the other control lever 76 is pivoted to pivot the other lateral foot-deck end 14 by the same angular disposition in the opposite direction.

As the axis of pivoting of the lateral foot-deck end, typically the same as the rotation axis for the wheels for split foot-deck designs, is displaced from the control pivot axis P about which the interface members 88 pivot, the accessory 20 can be subject to tension and distortion forces when the angular position of one control lever 76 differs significantly from the angular position of the other control lever 76. These tensions and distortion forces can cause the interface member 88 to twist on the foot-deck 13 if it is only permitted to pivot about the control pivot axis P; that is, to have one degree of freedom of movement. This twisting can leave undesirable marks on the foot-deck 13 of the self-balancing board 10, and increase the resistance to rapidly turning the self-balancing board 10.

Figure 16:
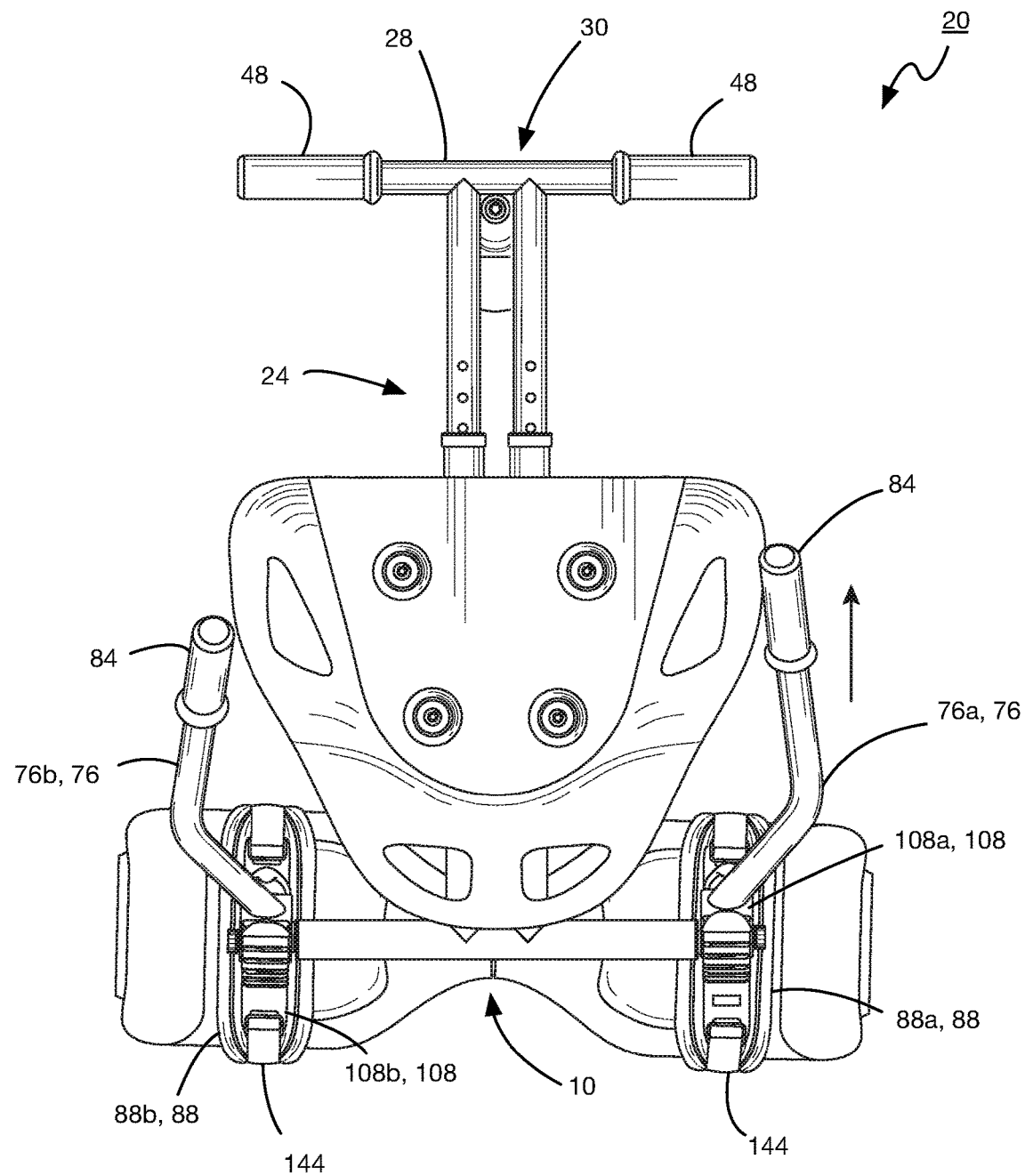
FIG. 16 is a top view of the accessory of FIG. 2 secured to the self-balancing board of FIG. 1, wherein a control lever has been moved and a control foot pivoted relative to the interface member.

FIG. 16 shows the accessory 20 secured to the self-balancing board 10 wherein the right control lever 76a has been pivoted forward and downward, and the left control lever 76b is in a neutral position. In order to reduce the amount of tension and/or distortion that the interface member 88 undergoes, the accessory 20 enables the control foot 108 to more than just pivot about the control pivot axis CP. In particular, the interface member 88 is held generally tightly against the foot-deck 13 of the self-balancing board 10, and the control foot 108 is permitted to pivot relative to the interface member 88 about the torque pivot post 104 (that is, a second degree of freedom of movement) to reduce tension and torsional forces applied by the interface member 88 to the top surface of the foot-deck 13. The lateral ridges 100 flanking the top recess 96 of the interface member 88 are features that act to restrict movement of the control foot 108 within a desired range. As the control foot 108 is somewhat tightly held against the platform 11 via the cinch strap 144, it is inhibited from pulling away from the platform 11 enough to clear the lateral ridges 100. Where the control levers 76 are pivoted to different angular dispositions and/or different directions, such as shown in FIG. 16, the control feet 108 pivot on the pivot axis defined by the torque pivot post 104. As a result, the right control foot 108a has pivoted counter-clockwise relative to the torque pivot axis TP and the torque pivot post 104 of the right interface member 88a. The left control foot 108b, however, hasn't pivoted substantially relative to the left interface member 88b.

By enabling at least two degrees of freedom of movement between the chassis 24 and the interface member 88 and, in particular, rotation of the interface member 88 relative to an axis that is normal to the foot-deck 13 when the assembly 20 is mounted thereon, the chance of incidental damage to the foot-deck 13 by the foot-deck engagement element 72, and resistance to pivoting of the control levers 76, can be reduced in some scenarios.

Various other means for enabling two or more degrees of freedom of movement of the interface members and the chassis can be employed. For example, the foot-deck engagement elements can have interface members fixed in position relative to them, and the coupling between foot-deck engagement elements and the chassis can allow for the foot-deck engagement elements to both pivot about the control pivot axis and to wobble. The wobble would enable the play between the chassis and the foot-deck engagement elements to compensate for the relative movement of the positions along the foot-deck to which the foot-deck engagement elements are secured.

The accessory 20 can be removed from the self-balancing board 10 by releasing the cinch straps 144 from one of the strap engagement hooks 128.

Figure 17:
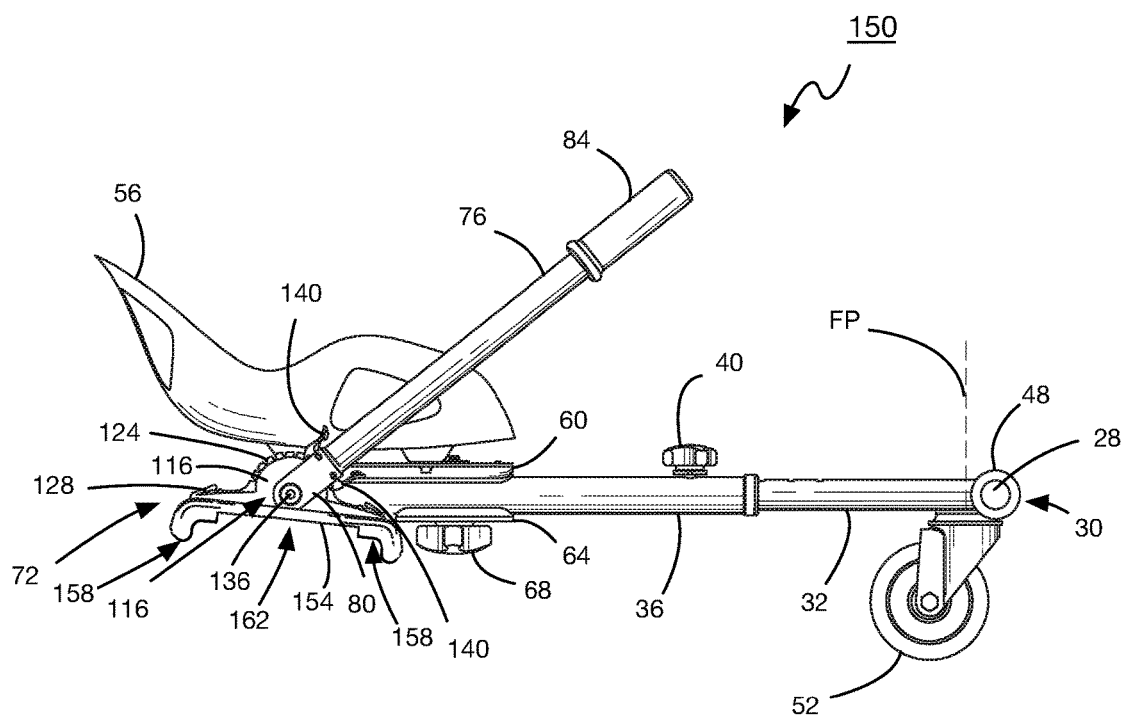
FIG. 17 is a perspective view of an accessory for use with the self-balancing board of FIG. 1 in accordance with another embodiment, wherein the interface members have gaps that are positioned on the central region of the foot-deck when the accessory is positioned thereon.

FIG. 17 shows an accessory 150 in accordance with another embodiment that is a slight variation of the accessory shown in FIGS. 1 to 14, and employs an interface member 154 that is constructed with thicker ends 158 at the front and rear of the interface member 154 on the underside thereof. A resultant gap 162 is created in the middle of the interface member 154. Some self-balancing boards are designed to maintain power to the motors while sensors in the middle of the foot-decks are triggered via pressure on the surface. As these sensors are generally centrally located in the foot-deck 13, by only contacting the foot-deck 13 proximal to their front and back edges, such self-balancing boards can be turned off while the accessory 150 is secured thereto. That is, by avoiding contact with a central region of the foot-deck 13 in which the sensors are located when the accessory 150 is positioned thereon, actuation of the sensors can be avoided. The gaps 162 are positioned on the central region of the foot-deck 13 when the accessory 150 is positioned thereon.

In some cases, the weight of the control levers can, when unheld, lay in a forward position, creating a forward shift in the center of gravity atop of the foot-deck. This can cause a self-balancing board to commence moving forward, in the direction of the center of gravity. As a result, it can lead to undesired movement of the accessory and self-balancing board to which it's secured and possible injury or damage to the accessory or surrounding objects.

Figure 18A:
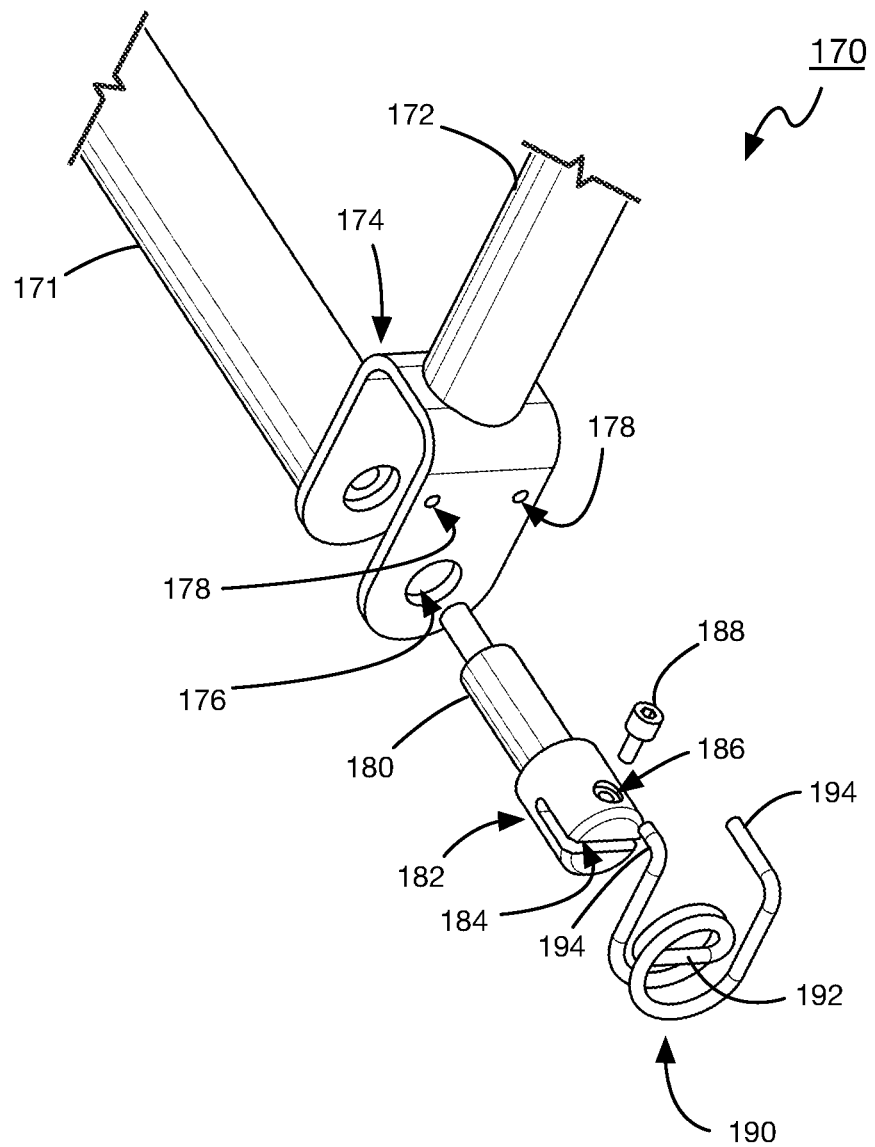
FIG. 18A is a partial exploded view of a biasing spring for biasing a control lever of an accessory for use with the self-balancing board of FIG. 1 in accordance with yet another embodiment.
Figure 18B:
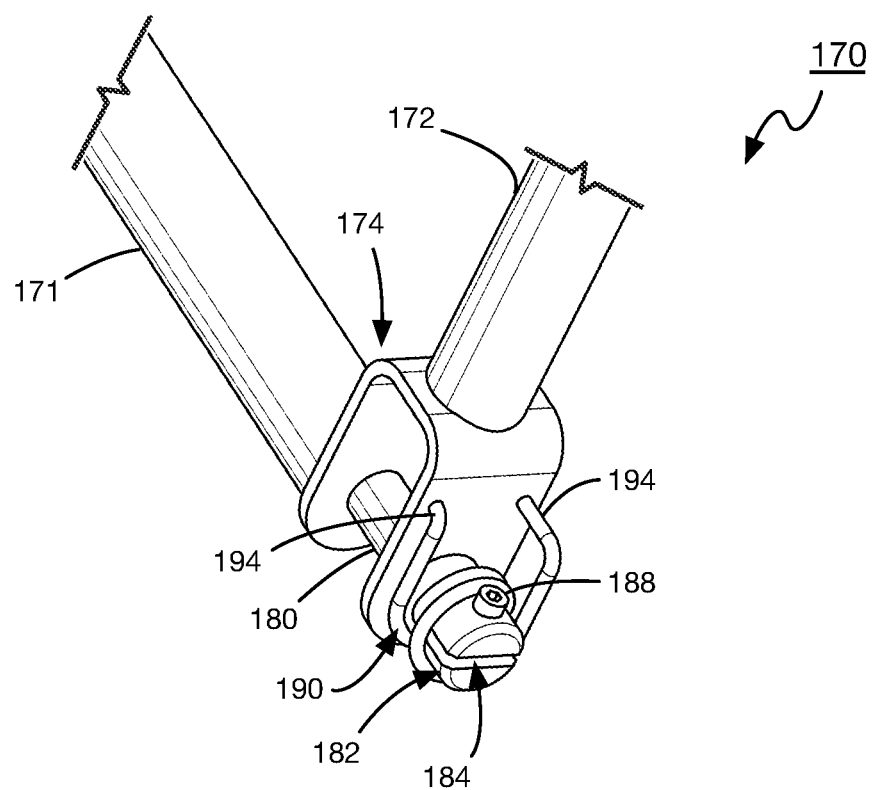
FIG. 18B is a partial assembled view of the biasing spring and accessory of FIG. 18A.

FIGS. 18A and 18B show a portion of another accessory 170 in accordance with a further embodiment that is a variation of the accessory shown in FIGS. 1 to 14. Positioned beside a rear cross-bar 171 of a chassis of the accessory 170 is a control lever 172 has a control lever pivot bracket 174 with a control pivot through-hole 176 extending through it. In addition, the external lateral side of the control lever pivot bracket 174 has two pin-holes 178 passing through it. A pivot bolt 180 has a bolt head 182 with a deep slot 184 in its face. A threaded hole 186 extends through from a side of the bold head 182 and meets the deep slot 184. A threaded screw 188 is dimensioned to be threadingly received within the threaded hole 186. A biasing structure in the form of a biasing spring 190 has a cross portion 192, with separate coils extending in counter directions from its ends. Each of the separate coils has an angled coil end 194, both of which are generally parallel.

During assembly, the pivot bolt 180 is inserted through the control pivot through-hole 176 of the control lever pivot bracket 174 and threaded into the rear cross-bar 171. The pivot bolt 180 is tightened and the deep slot 184 is aligned generally perpendicular to the desired neutral resting orientation of the control lever 172. The cross portion 192 of the biasing spring 190 is placed into the deep slot 184 and moved towards the back of the deep slot 190. The threaded screw 188 is then threaded through the threaded hole 186 until it encloses the cross portion 192 of the biasing spring 190 within the deep slot 184. Then, each of the angled coil ends 194 are inserted into a corresponding one of the pin-holes 178 and secured therein, such as by bending, taping, etc.

The biasing spring 190 is thus able to exert a net biasing force (as a result of the two portions of the biasing spring 190) on the control lever 172 towards an angular position relative to the chassis in which the center of gravity of the accessory 170 on the self-balancing board is sufficiently centered to avoid triggering motion of the self-balancing board in either a forward or a backward direction. That is, the foot-deck 13 of the self-balancing board 10 is not biased away from a generally horizontal orientation when the accessory is positioned thereon. This net biasing force, however, can readily be overcome by manually pivoting the control levers 172 in a forward or backward direction. The biasing spring 190 is sufficiently resilient to maintain a sufficient net biasing force on the control levers 172 over the lifetime of the accessory 170.

While, in this illustrated embodiment, the biasing structure is a single spring element, more than one biasing spring can be employed. Further, other types of biasing structures can be employed. For example, leaf springs can be employed so that pivoting of the control levers bends the leaf springs, thereby causing them to exert a biasing force on the control levers towards an angular position in which the center of gravity of the accessory on the self-balancing board is sufficiently centered. In another example, compressible members coupled to the pivot bolt can apply a biasing force on the control levers when they are pivoted away from an angular position in which the center of gravity of the accessory on the self-balancing board is sufficiently centered.

In other embodiments, biasing structures can be employed to bias the foot-deck engagement elements relative to the chassis so that, when the accessory is positioned on a self-balancing board, the foot-deck of the self-balancing board is unbiased away from a generally horizontal orientation.

Figure 19:
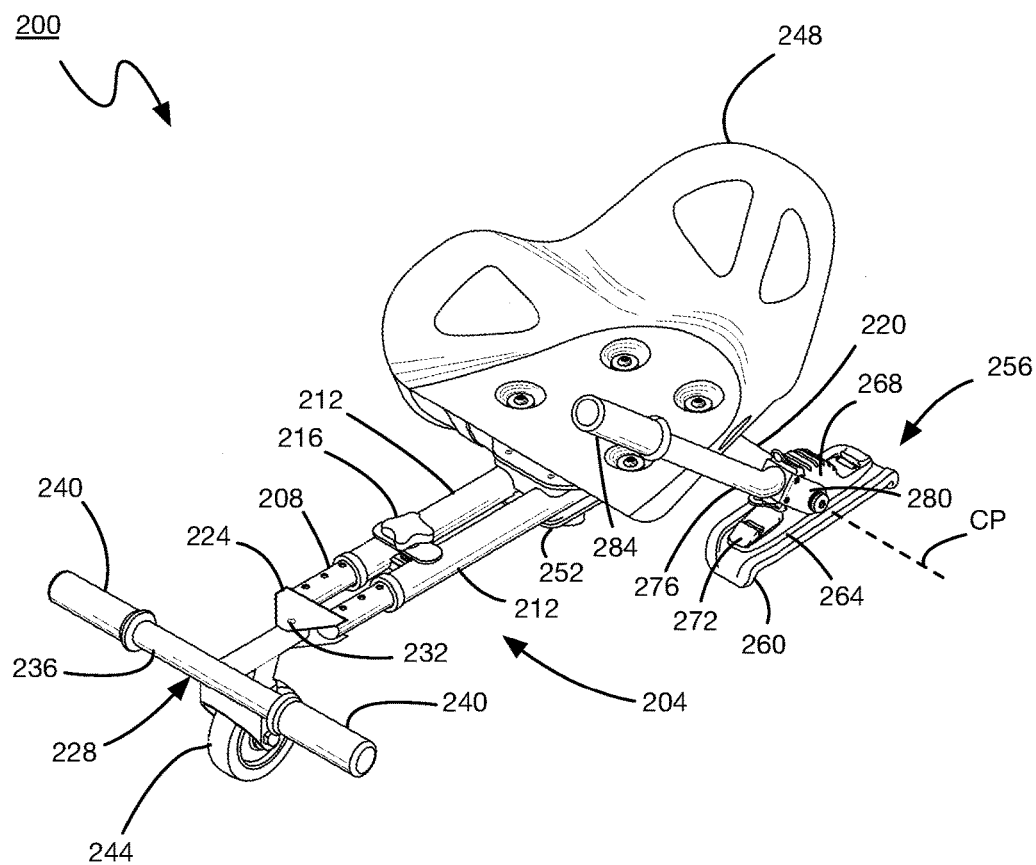
FIG. 19 is a perspective view of an accessory for the self-balancing board of FIG. 1 in accordance with a still further embodiment.

FIG. 19 shows an accessory 200 in accordance with another embodiment. The accessory 200 has a chassis 204 that includes two parallel longitudinal extension tubes 208 that are slidingly received within two parallel telescoping longitudinal tubes 212 and lockable at a number of positions via a locking knob 216. The two parallel telescoping longitudinal tubes 212 extend from a rear cross-bar 220 at the rear. The two longitudinal extension tubes 208 are joined to a pivot bracket 224. A head assembly 228 is coupled to the pivot bracket 224 and pivots about a vertically mounted head pivot bolt 232. The head assembly 228 includes a front cross-bar 236 having a pair of foot rests 240 at its lateral ends. A front wheel assembly 244 is mounted in a fixed orientation at the bottom of the head assembly 228. A seat 248 is mounted on the telescoping longitudinal tubes 212 via a seat mounting bracket 252.

A master foot-deck engagement element 256 at a first lateral end of the rear cross-bar 220 is coupled via a bridging member in the form of a linkage that passes through the rear cross-bar 220 to a slave foot-deck engagement element (not shown) so that they pivot together about a control pivot axis P. The master foot-deck engagement element 256 is similar to the foot-deck engagement elements of the accessory shown in FIGS. 1-14. It includes an interface member 260 and a control foot 264 that rests within a top recess thereof and pivots about a pivot post extending vertically from the interface member 260. The control foot 264 has a positioning arch 268 that has laterally extending position teeth around its periphery. A strap engagement hook 272 is formed on the top surface of the control foot 264 proximal to its front and rear ends. The slave foot-deck engagement element also has an interface member and a control foot similar to those of the master foot-deck engagement element, except that it does not have a positioning arch.

A control lever 276 is pivotally coupled to the positioning arch 268 via a control lever pivot bracket 280 so that it pivots around a control pivot axis P. The control lever 276 has a control grip 284 at its other end to enable a rider to grasp and control pivoting of the control lever 276 with one hand. The angular position of the control lever 276 can be adjusted via two positioning lock release levers.

The accessory 200 can be secured to a self-balancing board such as the one illustrated in FIG. 1 in the same way that the accessory 20 of FIGS. 1 to 14 is secured to it. The accessory 200 uses the self-balancing board as a motor means for propelling the combined accessory 200 and self-balancing board. By pivoting the control lever 276, the rider can control the pitch of the lateral foot-deck ends of the self-balancing board. As both the master foot-deck engagement element 256 and the slave foot-deck engagement element are pivotally fixed relative to each other, pivoting of the control lever 276 pivots the pitch of both lateral foot-deck ends simultaneously. As a result, both wheels accelerate or decelerate in the same direction at the same time. Steering of the accessory 200 is achieved by the rider pivoting the head assembly 228 using their feet. As the front wheel assembly 244 is fixed relative to the head assembly 228, it pivots with the head assembly 228 to steer the accessory 200 and the self-balancing board to which the accessory 200 is secured.

While control levers are employed in the above described embodiments to control the orientation of the lateral foot-deck ends of the self-balancing board, other control members can be employed for this purpose. For example, an accessory can have a chassis that is hinged partway along its longitudinal length and has a biasing structure for biasing a front chassis portion relative to a rear chassis portion about the hinge. For example, the front chassis portion may be biased relative to the rear chassis portion to a position where the chassis portions meet at an angle of 150 degrees, and the biasing structure permits pivoting of the front chassis portion and the rear chassis portion to lessen or greaten the angle between them. The front chassis portion can have a wheel and foot rests proximal to its front end, and the rear chassis portion can have a seat proximal to its rear end. Further, the rear chassis can include control members in the form of frame elements that are coupled relatively fixedly to two foot-deck engagement elements that can be positioned on the foot-deck of a self-balancing board proximal to its lateral ends. By extending their legs, a rider can cause the front and rear chassis portions to straighten, thereby reorienting the foot-deck engagement portions attached to the control members of the rear chassis portion, and the foot-deck ends of the self-balancing board with it to cause the self-balancing board to propel forward. Similarly, by pulling their feet closer, a rider can cause the front and rear chassis portions to contract, reducing the angle between them, thereby reorienting the foot-deck engagement portions attached to the control members of the rear chassis portion, and the foot-deck ends of the self-balancing board with it to cause the self-balancing board to reverse.

While the accessory in the embodiments described above has a single wheel assembly, it may be desirable to employ two or more wheels on the accessory, thereby providing four or more wheels on the combined accessory and self-balancing board.

Other types of travel surface-contacting elements to facilitate travel of the chassis over a travel surface other than wheels can be employed for the accessory. For example, the accessory can be fitted with a ski runner that could be used over indoor flooring, grass, snow, etc. In another embodiment, a tank track could be deployed on the accessory.

The length and orientation of the control lever(s) may be made to be adjustable in a variety of manners, such as the angle that they extend from the pivot brackets (the angular position), the angle at which they extend laterally away from a vertical axis, etc.

While, in the above-described embodiments, the control lever is separate from the foot-deck engagement element, in other embodiments, the control lever and the foot-deck engagement element can be manufactured as a unitary element or assembly. While the angular position of the control levers would not be adjustable relative to the foot-deck engagement elements, production costs may be reduced and product durability may be increased in some scenarios.

Where, in the above-described and illustrated embodiments, cinch straps are used to releasably secure the accessories to self-balancing boards, other means for securing the accessory to the self-balancing board can be employed. For example, the accessory may be bonded to the platform, although this approach would not allow the self-balancing board to be separable from the accessory. In another example, the accessory may be magnetically coupled to the self-balancing board via a magnetic element, thereby enabling the accessory to be removed from the self-balancing board when desired. Further, the foot-deck engagement elements may simply rest on the self-balancing board without securing the accessory thereto. In a further embodiment, the foot-deck engagement elements can releasably clamp onto the platform of the self-balancing board.

The accessories can be made to accommodate self-balancing boards of various shapes and sizes.

The seat can be made unitarily with the chassis in some embodiments.

Various types and configurations of chasses can be employed to provide a platform.

More sophisticated pedal or foot straps can be employed to further secure the rider.

Persons skilled in the art will appreciate that there are yet more alternative implementations and modifications possible, and that the above examples are only illustrations of one or more implementations. The scope, therefore, is only to be limited by the claims appended hereto.

The invention claimed is:

1. A vehicle assembly, comprising:
a self-balancing board, having the self-balancing board comprising a foot-deck having two lateral foot-deck ends, each lateral foot-deck end being coupled to a motor that drives a wheel in response to an orientation of the lateral foot-deck end relative to a horizontal plane; and
an accessory including:
  a chassis;
  at least one travel surface-contacting element coupled proximal to a first longitudinal end of the chassis to facilitate travel of the chassis over a travel surface;
  a seat coupled to the chassis and configured to support a person;
  a first foot-deck engagement element proximal to a second longitudinal end of the chassis distal to the first longitudinal end and constructed to engage the foot-deck of the self-balancing board proximal to the first lateral foot-deck end;
  a second foot-deck engagement element proximal to the second longitudinal end of the chassis and constructed to engage the foot-deck of the self-balancing board proximal to the second lateral foot-deck end; and
  at least one control member coupled to the first foot-deck engagement element and the second foot-deck engagement element to control the orientation of the lateral foot-deck ends relative to a horizontal plane via the first foot-deck engagement element and the second foot-deck engagement element.

2. A vehicle assembly according to claim 1, wherein the at least one control member comprises at least one control lever being coupled to the first foot-deck engagement element and the second foot-deck engagement element to control pivoting of the first foot-deck engagement element and the second foot-deck engagement element.

3. A vehicle assembly according to claim 2, further comprising a bridging member coupled to the first foot-deck engagement element and the second foot-deck engagement element to control pivoting of the first foot-deck engagement element and the second foot-deck engagement element relative to one another.

4. A vehicle assembly according to claim 3, wherein the at least one control lever comprises a first control lever coupled to the first foot-deck engagement element and the second foot-deck engagement element to thereby control simultaneous pivoting of the first foot-deck engagement element and the second foot-deck engagement element.

5. A vehicle assembly according to claim 2, wherein the at least one control lever comprises a first control lever coupled to the first foot-deck engagement element and a second control lever coupled to the second foot-deck engagement element.

6. A vehicle assembly according to claim 5, wherein the first foot-deck engagement element is independently pivotable relative to the second foot-deck engagement element about a control pivot axis that is generally parallel to the rotation axis of the wheels of the self-balancing board.

7. A vehicle assembly according to claim 6, wherein each of the first foot-deck engagement element and the second foot-deck engagement element comprises an interface member constructed to interface with the foot-deck proximal to one of the lateral foot-deck ends and having at least two degrees of freedom of movement relative to the chassis.

8. A vehicle assembly according to claim 7, wherein each of the first foot-deck engagement element and the second foot-deck engagement element further comprises a control foot that is pivotable relative to the chassis about the control pivot axis that is generally parallel to the rotation axis of the wheels of the self-balancing board and is movably coupled to the interface member to enable movement of the control foot relative to the interface member.

9. A vehicle assembly according to claim 8, wherein the control foot is pivotably coupled to the interface member about a torque pivot axis that is generally perpendicular to the control pivot axis.

10. A vehicle assembly according to claim 9, wherein the first foot-deck engagement element is constructed to secure to the foot-deck of the self-balancing board proximal to the first lateral foot-deck end and the second foot-deck engagement element is constructed to secure to the foot-deck of the self-balancing board proximal to the second lateral foot-deck end.

11. A vehicle assembly according to claim 10, wherein the first foot-deck engagement element is constructed to releasably secure to the foot-deck of the self-balancing board proximal to the first lateral foot-deck end and the second foot-deck engagement element is constructed to releasably secure to the foot-deck of the self-balancing board proximal to the second lateral foot-deck end.

12. A vehicle assembly according to claim 11, wherein each of the first foot-deck engagement element and the second foot-deck engagement element comprises a fastener for releasably securing the interface member against the foot-deck.

13. A vehicle assembly according to claim 12, wherein the interface member comprises the fastener.

14. A vehicle assembly according to claim 13, wherein the fastener comprises at least one of a strap, a clamp, and a magnetic element.

15. A vehicle assembly according to claim 14, wherein the control foot is pivotally secured to the interface member.

16. A vehicle assembly according to claim 12, wherein the fastener couples directly to the control foot.

17. A vehicle assembly according to claim 16, wherein the fastener comprises at least one of a strap, a clamp, and a magnetic element.

18. A vehicle assembly according to claim 17, wherein the interface member comprises features restricting movement of the control foot relative to the interface member within a desired range.

19. An accessory for a self-balancing board, the self-balancing board comprising a foot-deck having two lateral foot-deck ends, each lateral foot-deck end being coupled to a motor that drives a wheel in response to an orientation of the lateral foot-deck end relative to a horizontal plane, the accessory comprising:

a chassis;

at least one travel surface-contacting element coupled to the chassis to movably support the accessory on a travel surface;

a seat coupled to the chassis and configured to support a person;

a first foot-deck engagement element coupled to the chassis at a point spaced from at least one travel surface-contacting element and constructed to engage the foot-deck of the self-balancing board proximal to the first lateral foot-deck end;

a second foot-deck engagement element coupled to the chassis at a point spaced from at least one travel surface-contacting element and constructed to engage the foot-deck of the self-balancing board proximal to the second lateral foot-deck end; and a first control lever coupled to the first foot-deck engagement element and a second control lever coupled to the second foot-deck engagement element, wherein the first and second control levers are movable to control the orientation of the lateral foot-deck ends relative to a horizontal plane via the first foot-deck engagement element and the second foot-deck engagement element, wherein the first foot-deck engagement element is independently pivotable relative to the second foot-deck engagement element about a control pivot axis that is generally parallel to the rotation axis of the wheels of the self-balancing board, wherein each of the first foot-deck engagement element and the second foot-deck engagement element comprises an interface member constructed to interface with the foot-deck proximal to one of the lateral foot-deck ends and having at least two degrees of freedom of movement relative to the chassis.

* * * * *